United States Patent [19]

Tezuka et al.

[11] Patent Number: 5,793,725
[45] Date of Patent: Aug. 11, 1998

[54] OPTICAL INFORMATION RECORDING/REPRODUCING APPARATUS HAVING A COMPOSITE PRISM WITH A PLURALITY OF EMISSION SURFACES

[75] Inventors: Koichi Tezuka; Kyoko Miyabe; Satoshi Itami; Tohru Fujimaki, all of Kawaski, Japan

[73] Assignee: Fujitsu Limited, Kawasaki, Japan

[21] Appl. No.: 742,764

[22] Filed: Nov. 1, 1996

Related U.S. Application Data

[62] Division of Ser. No. 513,578, Aug. 10, 1995, Pat. No. 5,623,462, which is a continuation of Ser. No. 84,362, Jun. 30, 1993, abandoned.

[30] Foreign Application Priority Data

Jun. 21, 1993 [JP] Japan ..................... 5-149488

[51] Int. Cl.⁶ ..................... G11B 7/09
[52] U.S. Cl. ..................... 369/44.23; 369/44.41; 369/112
[58] Field of Search ..................... 369/44.12, 44.23, 369/44.14, 112, 44.41; 250/201.5

[56] References Cited

U.S. PATENT DOCUMENTS

| | | | |
|---|---|---|---|
| 4,841,507 | 6/1989 | Imai et al. | 369/44.23 |
| 5,105,411 | 4/1992 | Ishika | 369/44.41 |
| 5,161,139 | 11/1992 | Inoue et al. | 369/44.23 |
| 5,281,802 | 1/1994 | Kitabayashi | 250/201.5 |
| 5,353,267 | 10/1994 | Katayama | 369/13 |
| 5,360,970 | 11/1994 | Kay | 250/201.5 |

FOREIGN PATENT DOCUMENTS

| | | |
|---|---|---|
| 63-127436 | 5/1988 | Japan . |
| 1-144233 | 6/1989 | Japan . |
| 3-73425 | 3/1991 | Japan . |
| 3-157821 | 7/1991 | Japan . |
| 4-372728 | 12/1992 | Japan . |
| 6-135791 | 7/1994 | Japan . |
| 6-251396 | 9/1994 | Japan . |
| 7-050030 | 2/1995 | Japan . |

OTHER PUBLICATIONS

The Compact Disc Digital Audio System, M.G. Carasso, J.B.H. Peek and J.P. Sinjou, Philips Tech. Rev. 40, 151–155, 1982, No. 6.

"Translation of German Official Action of Jan. 13, 1994" German Patent Application P 43-22-149.1-53.

*Primary Examiner*—W. R. Young
*Attorney, Agent, or Firm*—Armstrong, Westerman, Hattori, McLeland & Naughton

[57] ABSTRACT

An optical information recording/reproducing apparatus records information on and/or reproduces information from an optical recording medium and detects a focal error based on a reflected light beam from the optical recording medium. The apparatus includes a composite prism which deflects a part of the reflected light beam to at least two positions excluding a central part of the reflected light beam, and a photodetector device having a plurality of photodetectors which respectively detect the deflected parts of the reflected light beam and output detection outputs. The focal error is detected based on the detection outputs of the photodetector device.

7 Claims, 30 Drawing Sheets

DISK NEAR

IN FOCUS

DISK FAR

FES=(A-B)+(C-D)>0

FES=0

FES<0

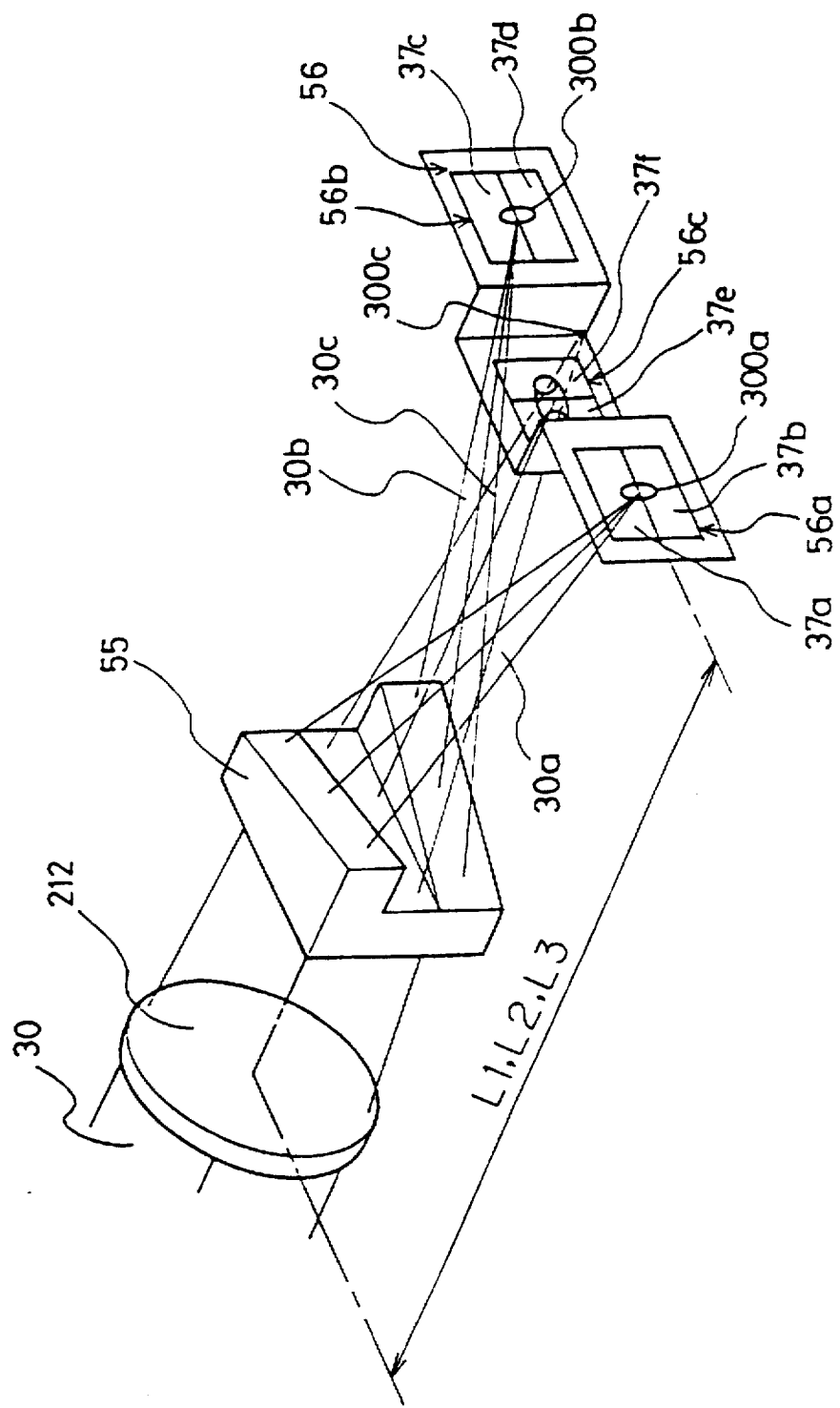

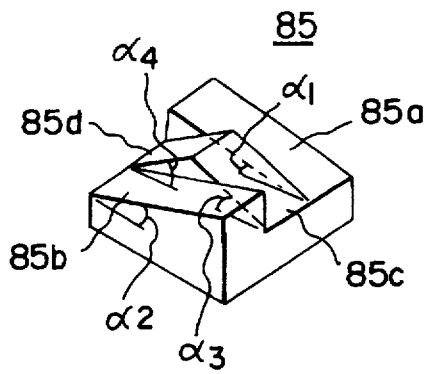 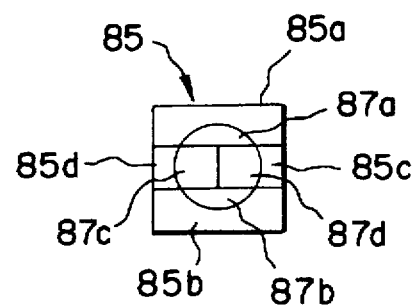
FIG. 34(a)   FIG. 34(b)
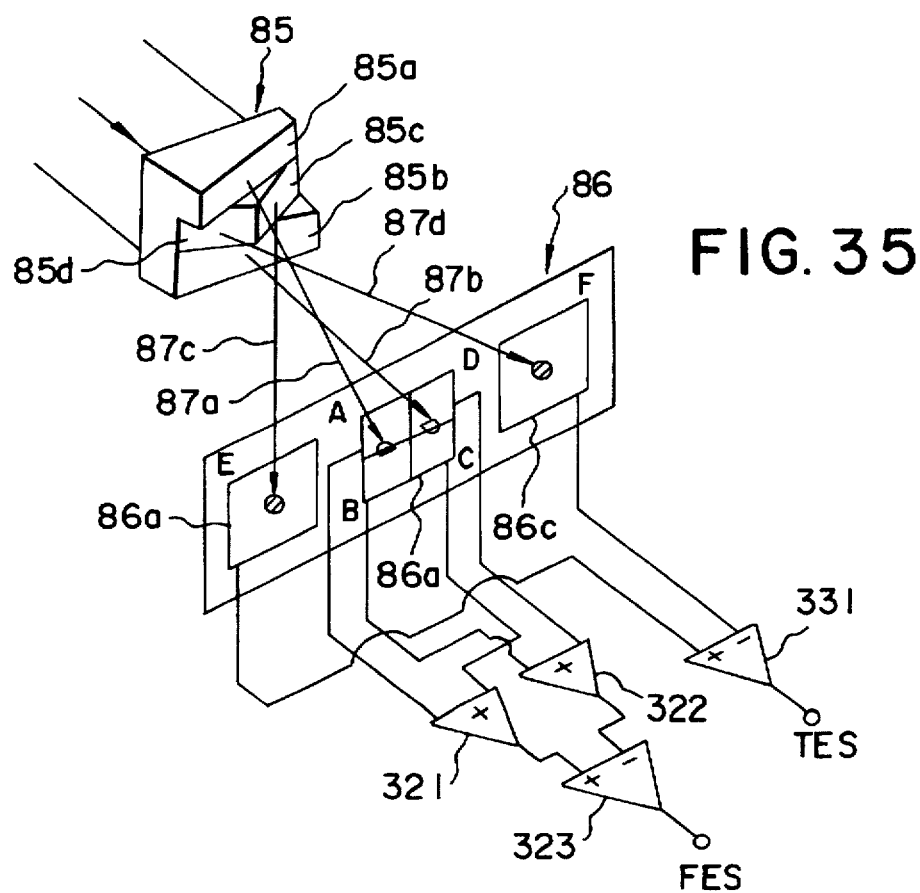
FIG. 35

OPTICAL INFORMATION RECORDING/ REPRODUCING APPARATUS HAVING A COMPOSITE PRISM WITH A PLURALITY OF EMISSION SURFACES

This is a Rule 60 Divisional of application Ser. No. 08/513,578 filed Aug. 10, 1995; now U.S. Pat. No. 5,623, 462; which is a Rule 62 Continuation of application Ser. No. 08/084,362 filed Jun. 30, 1993, now abandoned.

BACKGROUND OF THE INVENTION

The present invention generally relates to optical information recording/reproducing apparatuses, and more particularly to an optical information recording/reproducing apparatus which optically records information on a recording medium and/or optically reproduces the information from the recording medium.

An optical disk unit is an example of a unit which uses an optical information recording/reproducing apparatus. The optical disk unit can be used as a storage unit of a file system or the like, and is suited for storing programs and large amounts of data. In such an optical disk unit, it is desirable that an optical system thereof can accurately record and/or reproduce the information, and that the number of parts thereof is minimized so as to reduce the cost of the optical disk unit as a whole.

Various techniques have been proposed to detect a focal error in the optical disk unit. Generally, the astigmatism technique and the Foucault technique are well known. The Foucault technique is sometimes also referred to as the double knife edge technique.

Compared to the astigmatism technique, the Foucault technique is less affected by the external disturbance that occurs when a track on an optical disk is traversed, the birefringence of the optical disk. Accordingly, the mixture of the external disturbance into a focal error signal when the Foucault technique is employed is extremely small compared to the case where the astigmatism technique is employed. In addition, the Foucault technique detects a reflected light beam from the optical disk by a photodetector which is arranged in a vicinity of an image formation point of the optical beam, and for this reason, an abnormal offset is unlikely generated in the focal error signal even if the reflected light beam shifts from an optical axis. Because of these advantageous features obtainable by the Foucault technique, it is desirable to employ the Foucault technique as the focal error detection technique.

First, an example of an optical information recording/ reproducing apparatus within a conventional magneto-optic disk unit which employs the Foucault technique will be describe with reference to FIG. 1.

In an optical system of the optical information recording/ reproducing apparatus shown in FIG. 1, a laser beam which is emitted from a laser diode 201 is formed into a parallel beam having an oval cross section in a collimator lens 202, and is thereafter formed into a light beam having a circular cross section in a true circle correction prism 203. The light beam from the true circle correction prism 203 is transmitted through a beam splitter 204, reflected by a mirror 205, and is converged on a disk 207 via an objective lens 206. A reflected light beam from the disk 207 enters the beam splitter 204 via the objective lens 206 and the mirror 205, but this time the reflected light beam is reflected by the beam splitter 204 and is directed towards a beam splitter 208. The beam splitter 208 splits the reflected light beam into two light beams, and supplies one light beam to a magneto-optic signal detection system and the other light beam to a servo signal detection system.

The magneto-optic signal detection system includes a Wollaston prism 209, a lens 210 and a 2-part photodetector 211. One of the two light beams output from the beam splitter 208 is input to the 2-part photodetector 211 via the Wollaston prism 209 and the lens 210, and the 2-part photodetector 211 detects the magneto-optic signal, that is, the information signal, based on the input light beam.

The servo signal detection system includes a condenser lens 212, a beam splitter 213, a 2-part photodetector 214, a composite prism 215 and a 4-part photodetector 216. The other of the two light beams output from the beam splitter 208 is input to the 2-part photodetector 214 via the condenser lens 212 and the beam splitter 213 on one hand, and is input to the 4-part photodetector 216 via the composite prism 215 on the other. The 2-part photodetector 214 forms a tracking error detection system in the servo signal detection system, and generates a tracking error signal by obtaining a difference between the outputs of the 2-part photodetector 214 according to the push-pull technique. The composite prism 215 and the 4-part photodetector 216 form a focal error detection system in the servo signal detection system, and generates a focal error signal based on outputs of the 4-part photodetector 216 according to the Foucault technique. A focus servo operation controls the relative positional relationship of the objective lens 206 and the disk 207 based on the focal error signal, so that an in-focus position is located on the disk 207.

Next, a description will be given of the push-pull technique, by referring to FIGS. 2 and 3. FIG. 2 shows the relative positional relationship of the light beam which is irradiated via the objective lens 206 and the track on the disk 207, and FIG. 3 shows a spot of the reflected light beam which is formed on the 2-part photodetector 214 in correspondence with FIG. 2.

In FIG. 2, (b) shows a case where the spot of the light beam is positioned at the center of a guide groove 207a of the disk 207. In this case, the spot of the reflected light beam on the 2-part photodetector 214 is formed as shown in FIG. 3 (b), and a light intensity distribution b is symmetrical to the right and left. If the outputs of the 2-part photodetector 214 are denoted by A and B, a tracking error signal TES is generated based on the following formula (1).

$$TES = A - B \qquad (1)$$

In this case, the tracking error signal TES is 0.

If the spot of the light beam in FIG. 2 (b) shifts to the right as shown in FIG. 2 (a), a light intensity distribution a of the reflected light beam becomes unbalanced and the light intensity at the left detector part of the 2-part photodetector 214 becomes larger as shown in FIG. 3 (a). For this reason, the tracking error signal TES in this case takes a positive value.

On the other hand, if the spot of the light beam in FIG. 2 (b) shifts to the left as shown in FIG. 2 (c), a light intensity distribution c of the reflected light beam becomes unbalanced and the light intensity at the right detector part of the 2-part photodetector 214 becomes larger as show in FIG. 3 (c). For this reason, the tracking error signal TES in this case takes a negative value.

Accordingly, if the spot of the light beam on the disk 207 shifts to the right or left with respect to the central position of the guide groove 207a, the tracking error signal TES which is obtained in the above described manner changes to a more positive or negative value. Thus, it is possible to carry out an appropriate tracking control operation based on the tracking error signal TES.

FIG. 4 shows an example of the shapes of the composite prism 215 and the 4-part photodetector 216. The 4-part photodetector 216 includes detector parts 216a, 216b, 216c and 216d. A focal error signal FES is generated from outputs A, B, C and D respectively output from the detector parts 216a, 216b, 216c and 216d of the 4-part photodetector 216, based on the following formula (2).

$$FES=(A-B)+(C-D) \qquad (2)$$

Ideally, the focal error signal FES is 0 in a state where the spot of the light beam is in focus on the disk 207. In this case, the focal error signal FES having an S-curve as shown in FIG. 5 is obtained depending on the distance between the objective lens 206 and the disk 207. In FIG. 5, the ordinate indicates the focal error signal FES, and the abscissa indicates the distance between the objective lens 206 and the disk 207. The origin (0) on the abscissa corresponds to the in-focus position, and the above distance becomes smaller towards the left and larger towards the right in FIG. 5.

FIG. 6 shows the relative positional relationship of the objective lens 206 and the disk 207. In FIG. 6, (a) shows a case where the objective lens 206 is close to the disk 207 and the in-focus position is located above the disk 207 in the figure, (b) shows a case where the in-focus position is located on the disk 207, and (c) shows a case where the objective lens 296 is far from the disk 207 and the in-focus position is located between the disk 207 and the objective lens 206 in the figure.

FIG. 7 shows beam spots on the 4-part photodetector 216 for each relative positional relationship of the objective lens 206 and the disk 207 shown in FIG. 6. In FIG. 7, (a) shows the beam spots for the positional relationship shown in FIGS. 6 (a), (b) shows the beam spots for the in-focus positional relationship shown in FIGS. 6 (b), and (c) shows the beam spots for the positional relationship shown in FIG. 6 (c). As shown in FIG. 7 (b), the beam spots on the 4-part photodetector 216 have oval shapes in the in-focus position, and a division line E of the 4-part photodetector 216 is positioned at the center of each oval beam spot.

However, in the actual disk unit, the distribution of the quantity of the light beam irradiated on the disk 207 may be unbalanced, and errors may exist in the mounting positions of the composite prism 215 and the 4-part photodetector 216.

The light intensity distribution of the light beam which is emitted from the laser diode 201 can generally be approximated by a Gaussian distribution. Hence, if the optical axis of the light beam emitted from the laser diode 201 matches the optical axes of other optical parts, it is possible to obtain a Gaussian distribution in which the center of the light intensity of the light beam input to the objective lens 206 matches the optical axis (point 0) shown in FIG. 8. However, if the light beam emitted from the laser diode 201 is inclined by an angle θ in FIG. 1, the center of the light intensity of the light beam input to the objective lens 206 is shifted from the optical axis (point 0) in the Gaussian distribution as indicated by a dotted line in FIG. 8. The "unbalanced distribution" of the light quantity of the light beam irradiated on the disk 207 or "decentering", refers to such a difference between the optical axis and the center of light beam intensity distribution.

On the other hand, the "mounting error" of the composite prism 215, for example, refers to a positional error of the composite prism 215 in a y-direction in FIG. 4. If such a mounting error exists, the composite prism 215 cannot accurately split the incident light beam into two equal light beams. Generally, if the division line E of the composite prism 215 shifts a distance Ay in the y-direction from the center of the incident light beam, where the division line E extends in the x-direction in FIG. 4, the value of the mounting error can be obtained from [Δy/(diameter of light beam)]·100 (%).

For this reason, if the quantity of the light beam which is split into two in the composite prism 215 changes and a positional error of the division line E of the 4-part photodetector 216 occurs, a focal offset is generated. The generation of the "focal offset" means that the focal error signal FES described by the formula (2) becomes 0 at a position other than the in-focus position. Thus, according to the conventional Foucault technique, the tolerable margin of the focal error detection system is extremely small with respect to the unbalanced distribution of the quantity of light beam irradiated on the disk 207, the mounting error of the composite prism 215 and the 4-part photodetector 216 and the like. Therefore, there is a problem in that it is extremely difficult to obtain an accurate focal error signal due to the above error factors.

SUMMARY OF THE INVENTION

Accordingly, it is a general object of the present invention to provide a novel and useful optical information recording/reproducing apparatus in which the problem described above is eliminated.

Another and more specific object of the present invention is to provide an optical information recording/reproducing apparatus which records information on and/or reproduces information from an optical recording medium and detects a focal error based on a reflected light beam from the optical recording medium, comprising a composite prism deflecting a part of the reflected light beam to at least two positions excluding a central part of the reflected light beam, and photodetector means including a plurality of photodetectors for respectively detecting the deflected parts of the reflected light beam and outputting detection outputs, where the focal error is detected based on the detection outputs of the photodetector means. According to the optical information recording/reproducing apparatus of the present invention, it is possible to obtain an accurate focus error signal because the tolerable margin of the focus error detection system can be set large with respect to the unbalanced distribution of the quantity of the light beam irradiated on the optical recording medium, the mounting error of the composite prism, the photodetector and the like.

Still another object of the present invention is to provide an optical information recording/reproducing apparatus which records information on and/or reproduces information from an optical recording medium and detects a tracking error and a focal error based on a reflected light beam from the optical recording medium, comprising beam splitter means for splitting the reflected light beam into at least one first beam which is used for detecting the tracking error and at least two second beams which are used for detecting the focal error, and photodetector means including a first photodetector which detects the first beam at a position other than an image formation point of the first beam, and second photodetectors for detecting the second beams approximately at image formation points of the second beams. According to the optical information recording/reproducing apparatus of the present invention, it is unnecessary to provide two independent optical paths even if the focal error is to be detected according to the Foucault technique and the tracking error is to be detected according to the push-pull technique. As a result, it is possible to reduce the space occupied by the optical system within the optical information recording/reproducing apparatus, and to reduce the number of required parts. For this reason, it is possible to reduce both the size and cost of the optical information recording/reproducing apparatus and an optical disk unit to which the optical information recording/reproducing apparatus may be applied.

A further object of the present invention is to provide an optical information recording/reproducing apparatus which records information on and/or reproduces information from an optical recording medium and detects a focal error and a tracking error based on a reflected light beam from the optical recording medium, comprising beam splitter means for splitting the reflected light beam into first through fourth light beams which propagate generally in a predetermined direction, and photodetector means for detecting the focal error in response to the first and second light beams, and for detecting the tracking error in response to the third and fourth light beams. According to the optical information recording/reproducing apparatus of the present invention, it is possible to improve the reliability of the focus error detection and tracking error detection. In addition, it is possible to reduce both the size and cost of the optical information recording/reproducing apparatus and an optical disk unit to which the optical information recording/reproducing apparatus may be applied.

Another object of the present invention is to provide an optical information recording/-reproducing apparatus which records an information signal on and/or reproduces the information signal from an optical recording medium and detects a tracking error, a focal error, the information signal and an address signal based on a reflected light beam from the optical recording medium, comprising beam splitter means for splitting the reflected light beam into first through sixth light beams which propagate generally in a predetermined direction, and photodetector means for detecting the focal error in response to the first and second light beams, and for detecting the tracking error, the information signal and the address signal in response to the third through sixth light beams. According to the optical information recording/reproducing apparatus of the present invention, it is possible to detect the focal error signal, the tracking error signal, the information signal and the address signal by the single photodetector means. For this reason, it is possible to detect all of the necessary signals using a single optical path to the beam splitter means and the single photodetector means. Hence, it is possible to reduce both the size and cost of the optical information recording/reproducing apparatus and an optical disk unit to which the optical information recording/reproducing apparatus may be applied.

Other objects and further features of the present invention will be apparent from the following detailed description when read in conjunction with the accompanying drawings.

BRIEF DESCRIPTION OF THE DRAWINGS

FIG. 23 is a perspective view showing an essential part of the seventh embodiment;

FIGS. 34(a) and 34(b) are diagrams showing a composite prism of the eleventh embodiment;

FIG. 35 is a perspective view showing an essential part of the eleventh embodiment;

DESCRIPTION OF THE PREFERRED EMBODIMENTS

Figure 9:
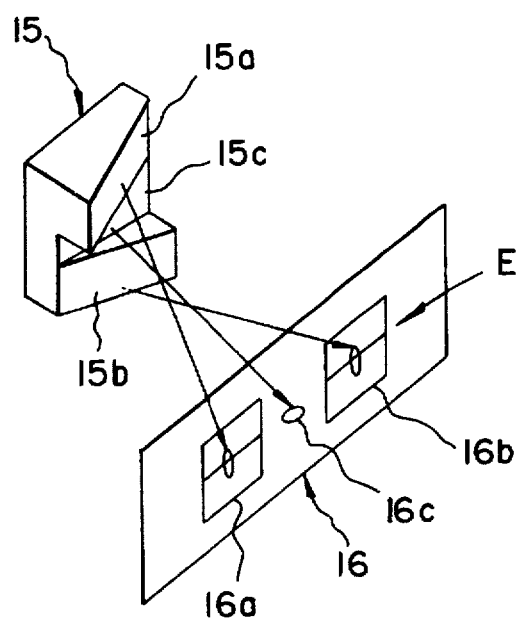
FIG. 9 is a perspective view showing an essential part of a first embodiment of an optical information recording/reproducing apparatus according to the present invention.

FIG. 9 is a perspective view showing an essential part of a first embodiment of an optical information recording/reproducing apparatus according to the present invention. A composite prism 15 includes tapered parts 15a and 15b, and a central part 15c having no taper. On the other hand, a 4-part photodetector 16 includes 2-part photodetectors 16a and 16b, and a central part 16c which includes no photodetector part. The composite prism 15 and the 4-part photodetector 16 are provided in place of the composite prism 215 and the 4-part photodetector 216 in the optical system of the optical information recording/reproducing apparatus shown in FIG. 1, for example, and detect the focal error.

The reflected light beam which is obtained via the beam splitters 204 and 208, the condenser lens 212 and the beam splitter 213 is input to the composite prism 15. Out of the reflected light beam which is input to the composite prism 15, the light beams transmitted through the tapered parts 15a and 15b of the composite prism 15 form spots on the corresponding 2-part photodetectors 16a and 16b of the 4-part photodetector 16. Accordingly, by carrying out the operation of the formula (2) described above using the outputs of the 2-part photodetectors 16a and 16b, it is possible to obtain a focal error signal FES similarly to the conventional case.

On the other hand, out of the reflected light beam, the light beam which is transmitted through the central part 15c of the composite prism 15 is input to the central part 16c of the 4-part photodetector 16. As a result, out of the reflected light beam input to the composite prism 15, the light beam which is transmitted through the central part 15c of the composite prism 15 is not input to the 2-part photodetectors 16a and 16b of the 4-part photodetector 16, that is, not input to a light sensitive part of the 4-part photodetector 16.

In this embodiment, the spots which are formed on the 2-part photodetectors 16a and 16b of the 4-part photodetector 16 have oval shapes with a major axis greater than that of the conventional case. In other words, the oval spots are longer in a direction perpendicular to the division line E of each of the 2-part photodetectors 16a and 16b. For this reason, the focal offset which is generated by the positional error of the division lines E is extremely small.

Figure 10:
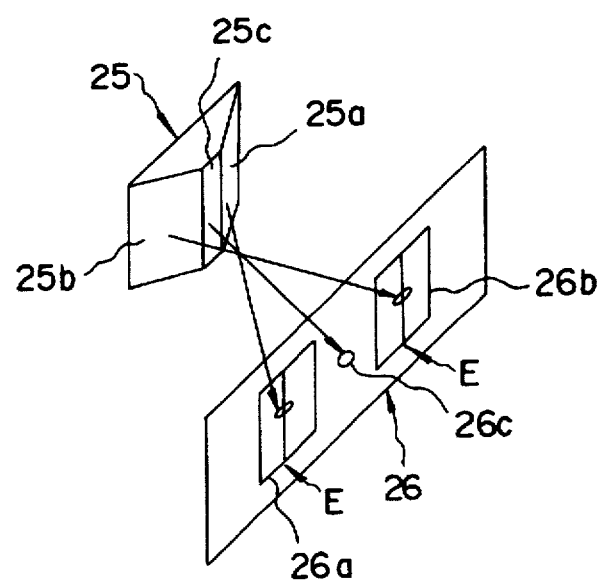
FIG. 10 is a perspective view showing an essential part of a second embodiment of the optical information recording/reproducing apparatus according to the present invention.

Next, a description will be given of a second embodiment of the optical information recording/reproducing apparatus according to the present invention, by referring to FIG. 10. FIG. 10 is a perspective view showing an essential part of the second embodiment.

In FIG. 10, a composite prism 25 has a trapezoidal column shape and includes tapered parts 25a and 25b, and a central part 25c which has no taper. On the other hand, a 4-part photodetector 26 includes 2-part photodetectors 26a and 26b, and a central part 26c which includes no photodetector part. The composite prism 25 and the 4-part photodetector 26 are provided in place of the composite prism 215 and the 4-part photodetector 216 in the optical system of the optical information recording/reproducing apparatus shown in FIG. 1, for example, and detect the focal error.

The reflected light beam which is obtained via the beam splitters 204 and 208, the condenser lens 212 and the beam splitter 213 is input to the composite prism 25. Out of the reflected light beam which is input to the composite prism 25, the light beams transmitted through the tapered parts 25a and 25b of the composite prism 25 form spots on the corresponding 2-part photodetectors 26a and 26b of the 4-part photodetector 26. Accordingly, by carrying out the operation of the formula (2) described above using the outputs of the 2-part photodetectors 26a and 26b, it is possible to obtain a focal error signal FES similarly to the conventional case.

On the other hand, out of the reflected light beam, the light beam which is transmitted through the central part 25c of the composite prism 25 is input to the central part 26c of the 4-part photodetector 26. As a result, out of the reflected light beam input to the composite prism 25, the light beam which is transmitted through the central part 25c of the composite prism 25 is not input to the 2-part photodetectors 26a and 26b of the 4-part photodetector 26, that is, not input to a light sensitive part of the 4-part photodetector 26.

In this embodiment, the spots which are formed on the 2-part photodetectors 26a and 26b of the 4-part photodetector 26 have oval shapes with a major axis greater than that of the conventional case. In other words, the oval spots are longer in a direction perpendicular to the division line E of each of the 2-part photodetectors 26a and 26b. For this reason, the focal offset which is generated by the positional error of the division lines E is extremely small.

Figure 11:
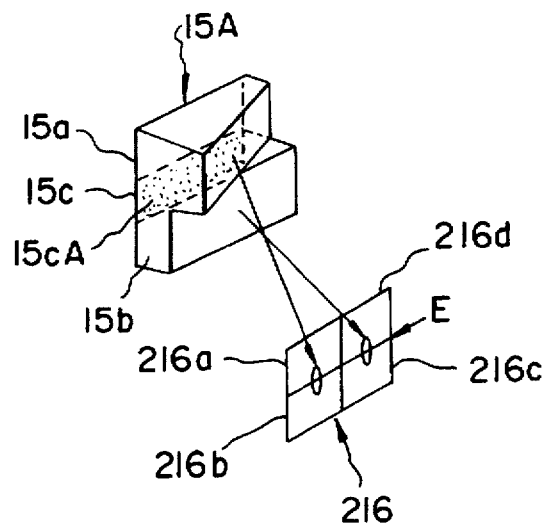
FIG. 11 is a perspective view showing an essential part of a third embodiment of the optical information recording/reproducing apparatus according to the present invention.

Next, a description will be given of a third embodiment of the optical information recording/reproducing apparatus according to the present invention, by referring to FIG. 11. FIG. 11 is a perspective showing an essential part of the third embodiment. In FIG. 11, those parts which are the same as those corresponding parts in FIG. 9 are designated by the same reference numerals, and a description thereof will be omitted.

Figure 1:
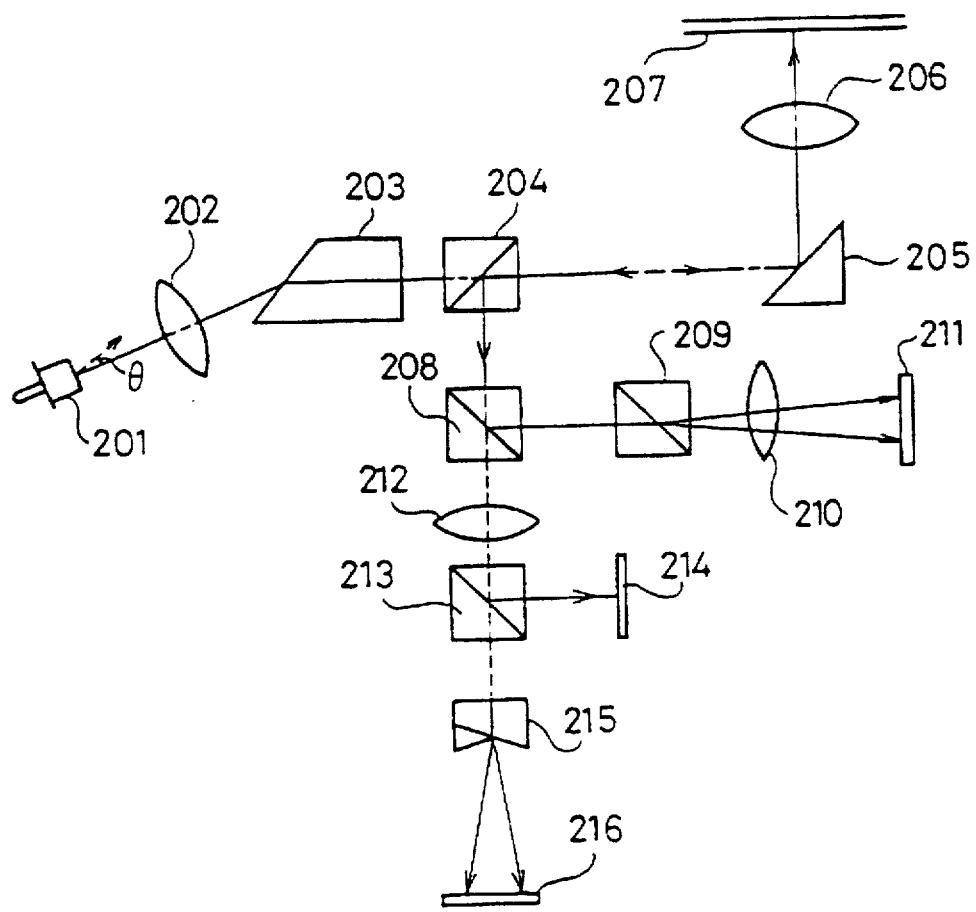
FIG. 1 is a diagram showing an example of a conventional optical information recording/reproducing apparatus.

In this embodiment, a light absorbing or blocking layer 15cA is formed on the central part 15c of a composite prism 15A so as to absorb or block the light beam which has the wavelength of the light emitted from the laser diode 201 shown in FIG. 1. This light absorbing or blocking layer 15cA may be formed on the front surface or the rear surface of the composite prism 15A at the central part 15c. In addition, this embodiment uses the same 4-part photodetector 216 used in the conventional case shown in FIG. 1.

In this case, the reflected light beam which is obtained via the beam splitters 204 and 208, the condenser lens 212 and the beam splitter 213 is input to the composite prism 15A. Out of the reflected light beam which is input to the composite prism 15A, the light beams transmitted through the tapered parts 15a and 15b of the composite prism 15A form spots on the corresponding detector parts 216a, 216b, 216c and 216d of the 4-part photodetector 216. Accordingly, by carrying out the operation of the formula (2) described above using the outputs of the detector parts 216a, 216b, 216c and 216d, it is possible to obtain a focal error signal FES similarly to the conventional case.

On the other hand, out of the reflected light beam, the light beam which is input to the central part 15c of the composite prism 15A is absorbed or blocked light absorbing or blocking layer 15cA and will not be input to the 4-part photodetector 216. As a result, out of the reflected light beam input to the composite prism 15A, the light beam which is input to the central part 15c of the composite prism 15A is not input to the detector parts 216a, 216b, 216c and 216d of the 4-part photodetector 216, that is, not input to a light sensitive part of the 4-part photodetector 216.

In this embodiment, the spots which are formed on the detector parts 216a, 216b, 216c and 216d of the 4-part photodetector 216 have oval shapes with a major axis greater than that of the conventional case. In other words, the oval spots are longer in a direction perpendicular to the division line E of the 4-part photodetector 216. For this reason, the focal offset which is generated by the positional error of the division line E is extremely small.

Figure 12:
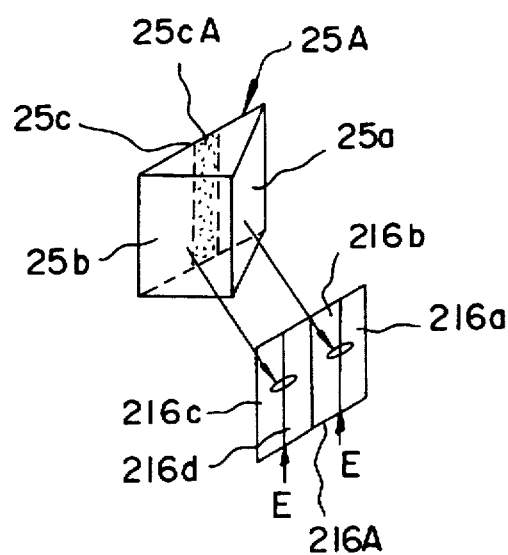
FIG. 12 is a perspective view showing an essential part of a fourth embodiment of the optical information recording/reproducing apparatus according to the present invention.
Figure 13A:
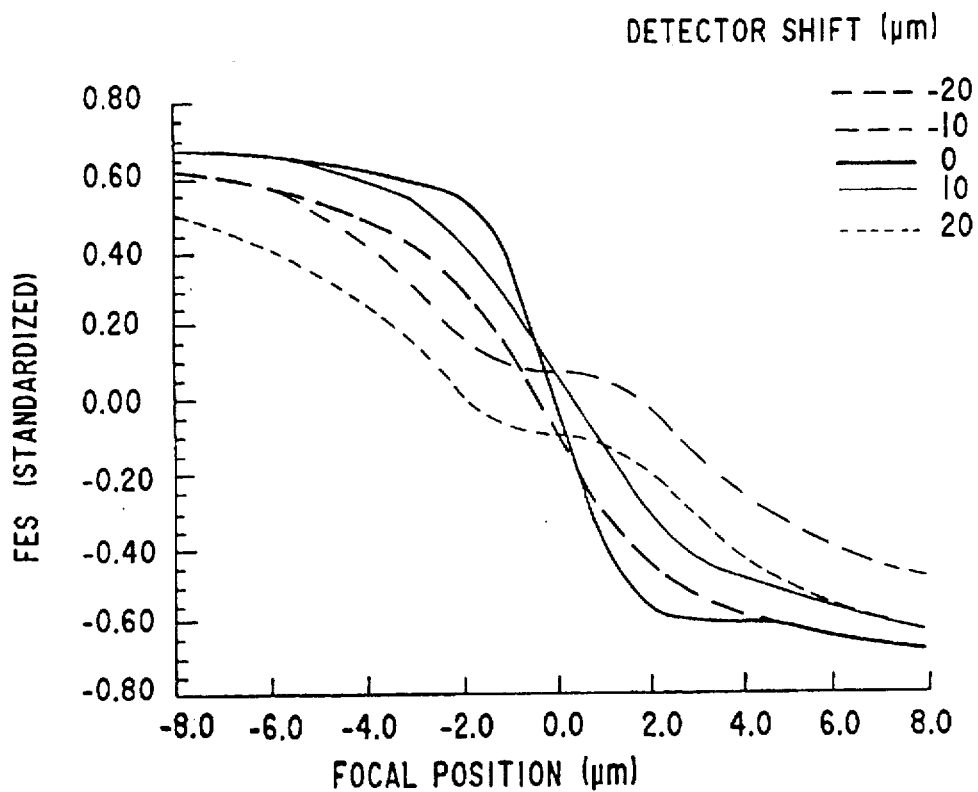
FIGS. 13(a), 13(b), 13(c) and 13(d) are diagrams showing simulation results describing the relationship of a focus position and a focal error signal FES in the prior art.
Figure 13B:
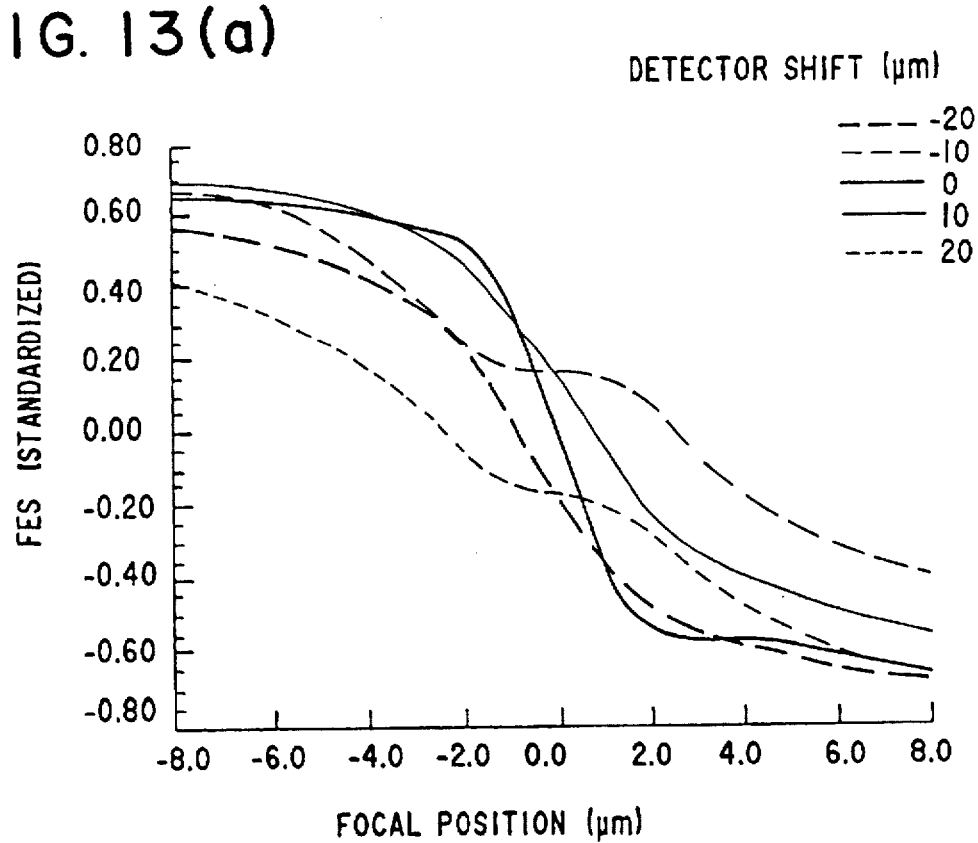
Figure 13C:
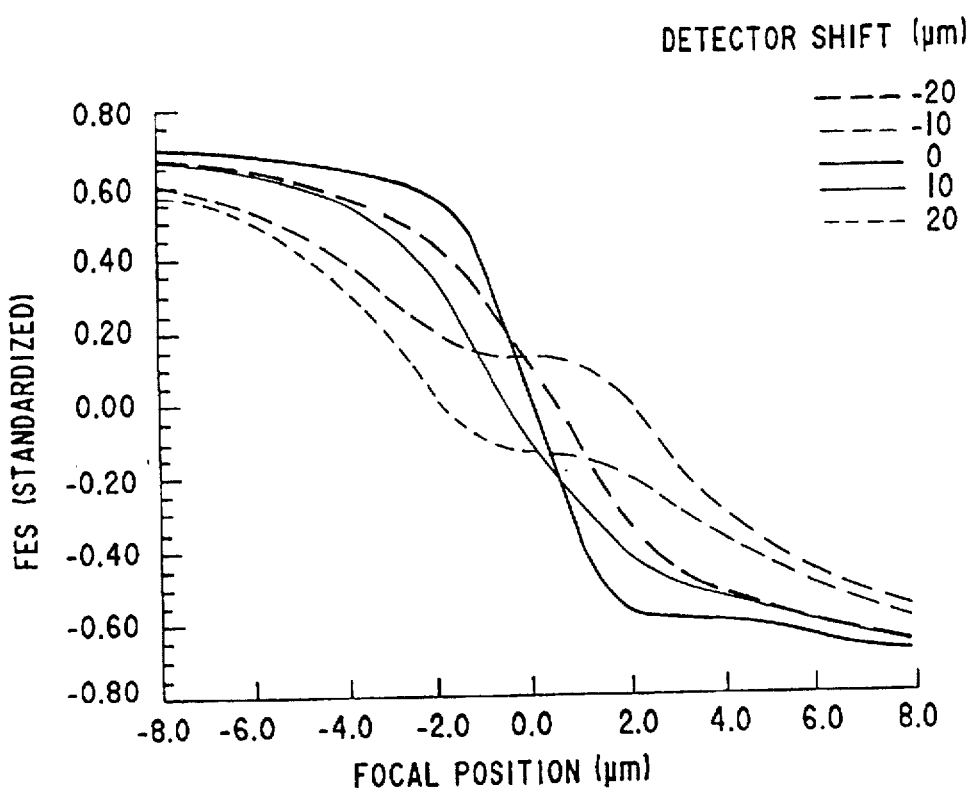
Figure 13D:
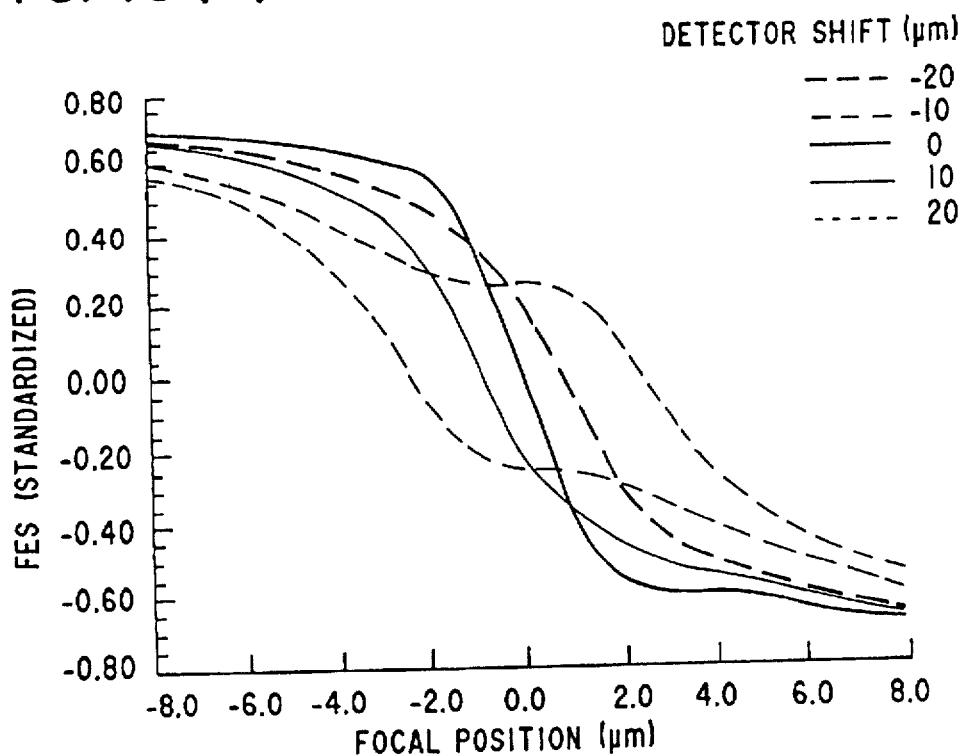
Figure 14A:
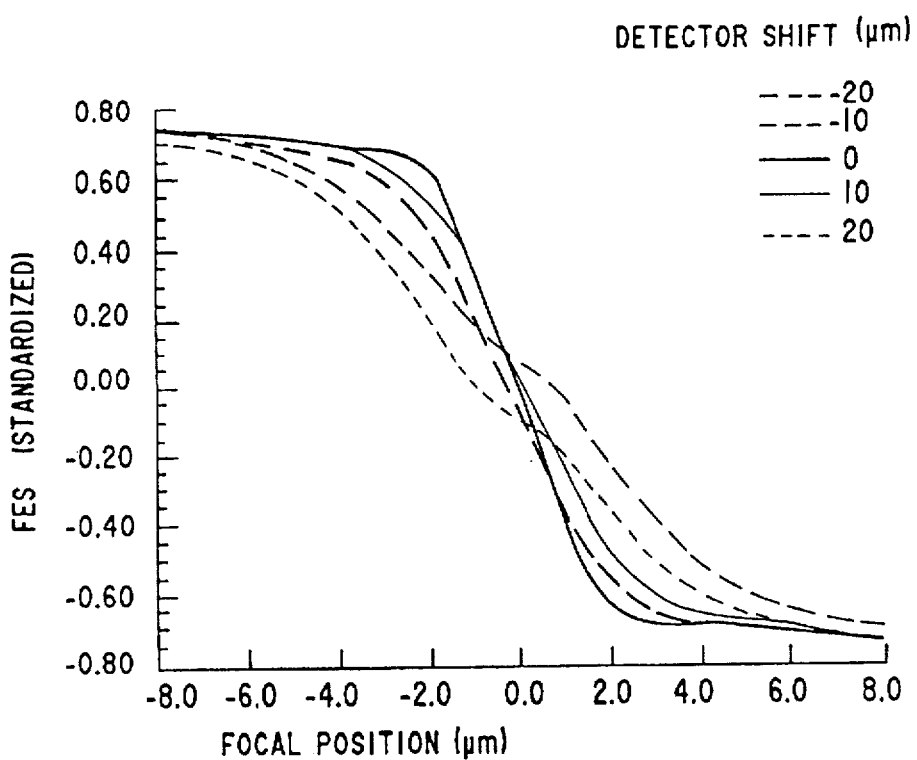
FIGS. 14(a), 14(b), 14(c) and 14(d) are diagrams showing simulation results describing the relationship of the focus position and the focal error signal FES in the first or third embodiment.
Figure 14B:
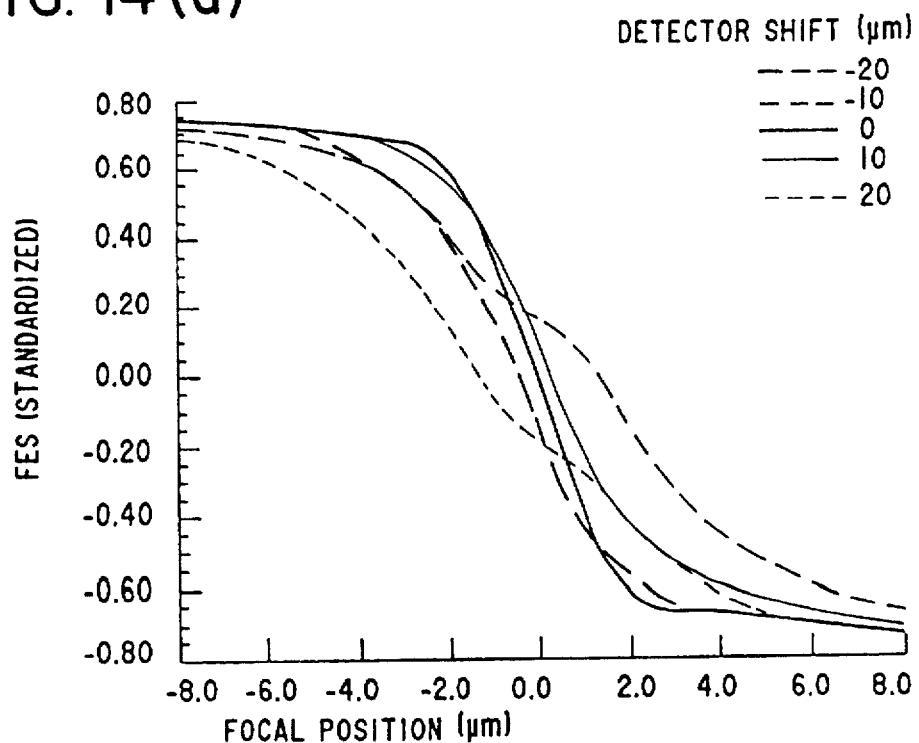
Figure 14C:
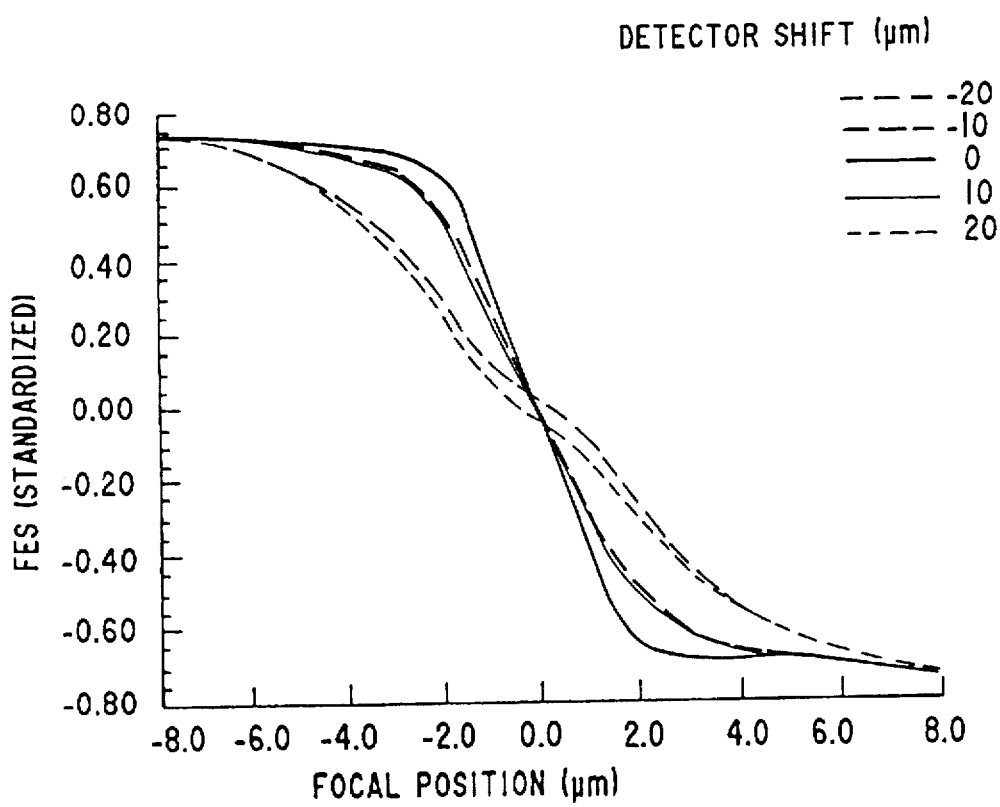
Figure 14D:
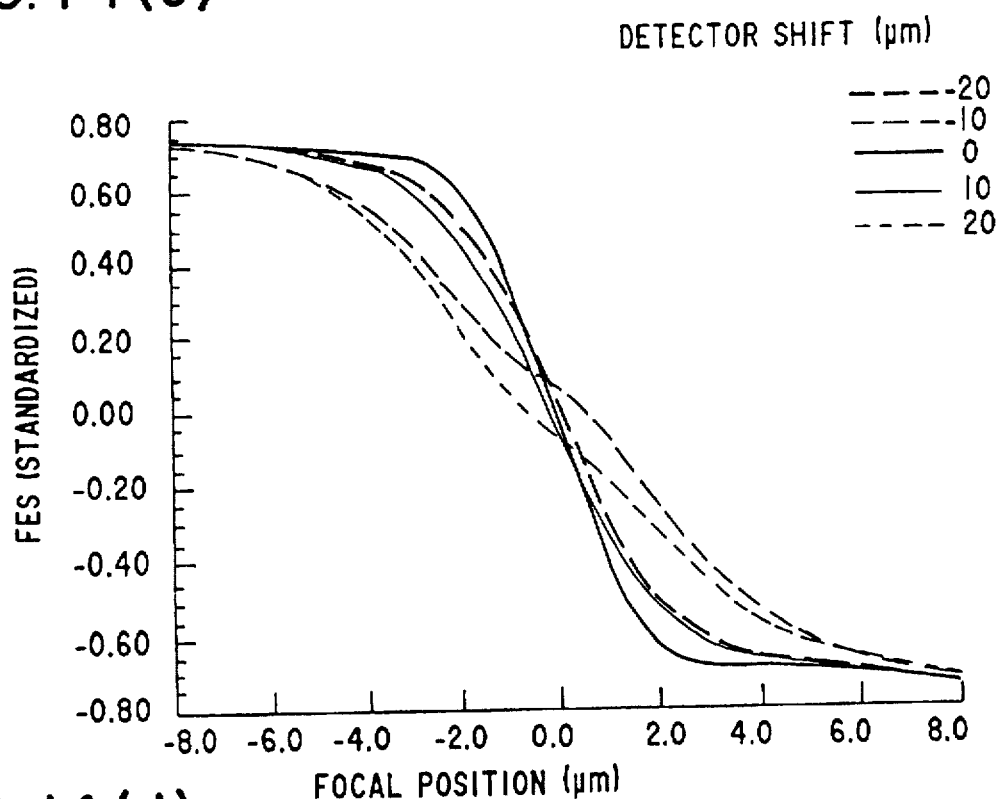

Next, a description will be given of a fourth embodiment of the optical information recording/reproducing apparatus according to the present invention, by referring to FIG. 12. FIG. 12 is a perspective showing an essential part of the fourth embodiment. In FIG. 12, those parts which are the same as those corresponding parts in FIG. 10 are designated by the same reference numerals, and a description thereof will be omitted.

In this embodiment, a light absorbing or blocking layer 25cA is formed on the central part 25c of a composite prism 25A which has a triangular prism shape, so as to absorb or block the light beam which has the wavelength of the light emitted from the laser diode 201 shown in FIG. 1. This light absorbing or blocking layer 25cA may be formed on the front surface or the rear surface of the composite prism 25A at the central part 25c. In addition, this embodiment uses a 4-part photodetector 216A shown in FIG. 12.

In this case, the reflected light beam which is obtained via the beam splitters 204 and 208, the condenser lens 212 and the beam splitter 213 is input to the composite prism 25A. Out of the reflected light beam which is input to the composite prism 25A, the light beams transmitted through the tapered parts 25a and 25b of the composite prism 25A form spots on the corresponding detector parts 216a, 216b, 216c and 216d of the 4-part photodetector 216A. Accordingly, by carrying out the operation of the formula (2) described above using the outputs of the detector parts 216a, 216b, 216c and 216d, it is possible to obtain a focal error signal FES similarly to the conventional case.

On the other hand, out of the reflected light beam, the light beam which is transmitted through the central part 25c of the composite prism 25A is absorbed or blocked light absorbing or blocking layer 25cA and will not be input to the 4-part photodetector 216A. As a result, out of the reflected light beam input to the composite prism 25A, the light beam which is input to the central part 25c of the composite prism 25A is not input to the detector parts 216a, 216b, 216c and 216d of the 4-part photodetector 216A, that is, not input to a light sensitive part of the 4-part photodetector 216A.

In this embodiment, the spots which are formed on the detector parts 216a, 216b, 216c and 216d of the 4-part photodetector 216A have oval shapes with a major axis greater than that of the conventional case. In other words, the oval spots are longer in a direction perpendicular to the division lines E of the 4-part photodetector 216A. For this reason, the focal offset which is generated by the positional error of the division lines E is extremely small.

Figure 4:
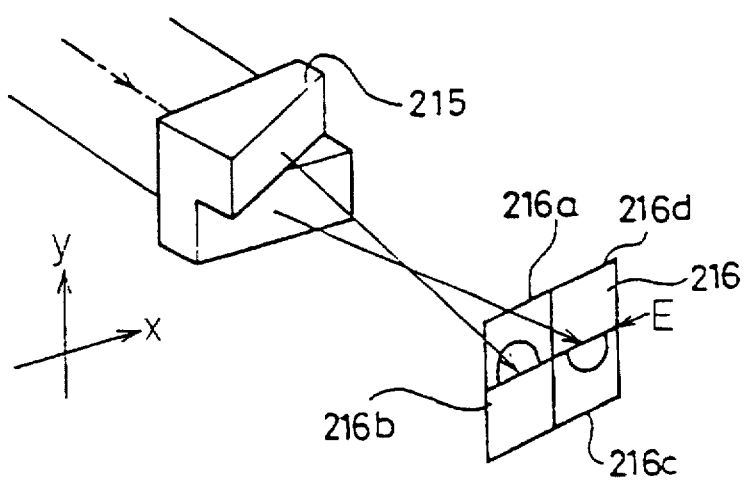
FIG. 4 is a perspective view showing an example of the shapes of a composite prism and a 4-part photodetector.
Figure 2A:
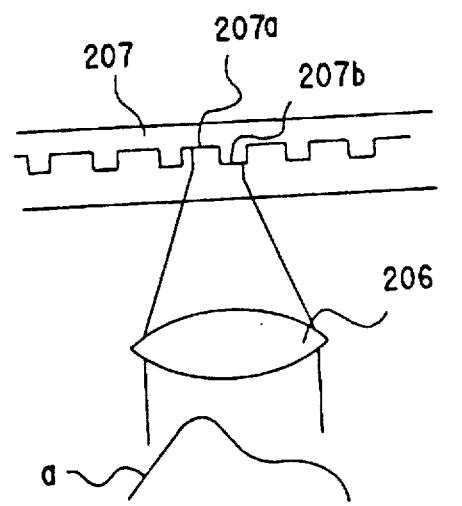
FIGS. 2(a), 2(b) and 2(c) are diagrams showing the relative positional relationship between a light beam which is irradiated via an objective lens and a track on an optical disk for explaining the push-pull technique.
Figure 2B:
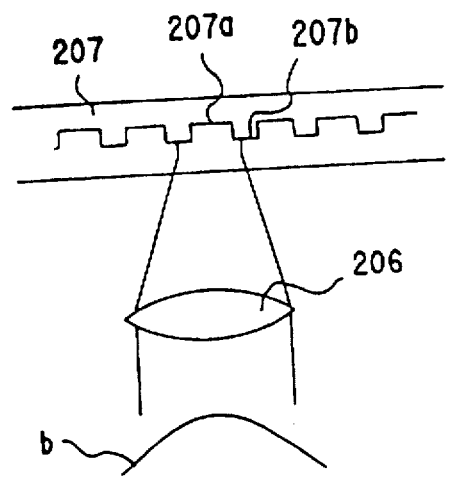
Figure 2C:
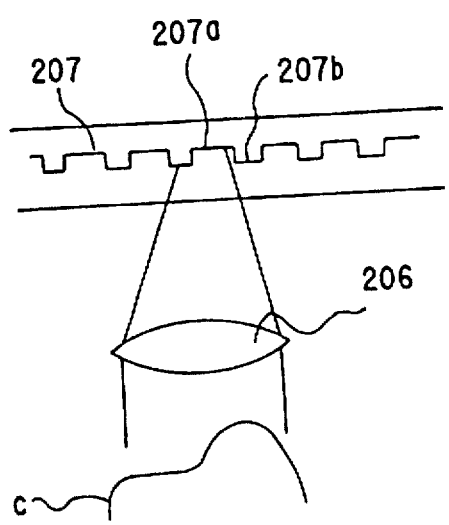
Figure 3A:
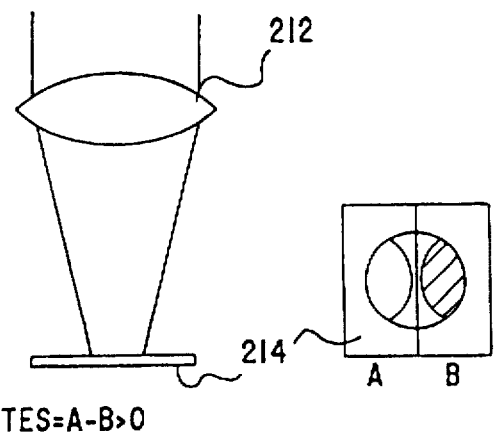
FIGS. 3(a), 3(b) and 3(c) are diagrams showing a spot of a reflected light beam which is formed on a 2-part photodetector.
Figure 3B:
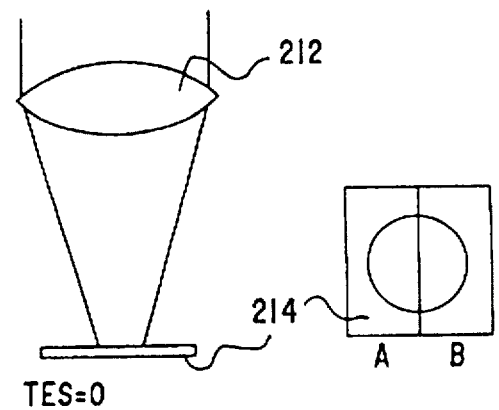
Figure 3C:
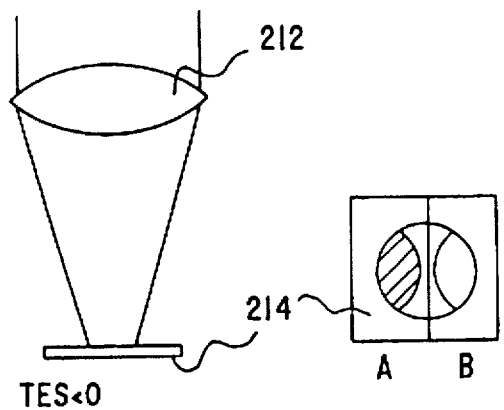
Figure 5:
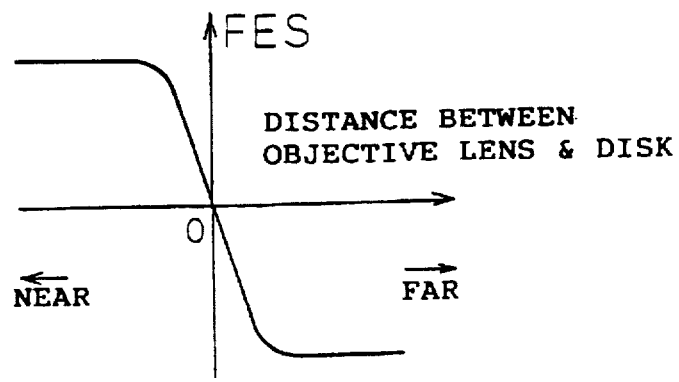
FIG. 5 is a diagram showing the relationship of a distance between the objective lens and the disk and a focal error signal FES.
Figure 8:
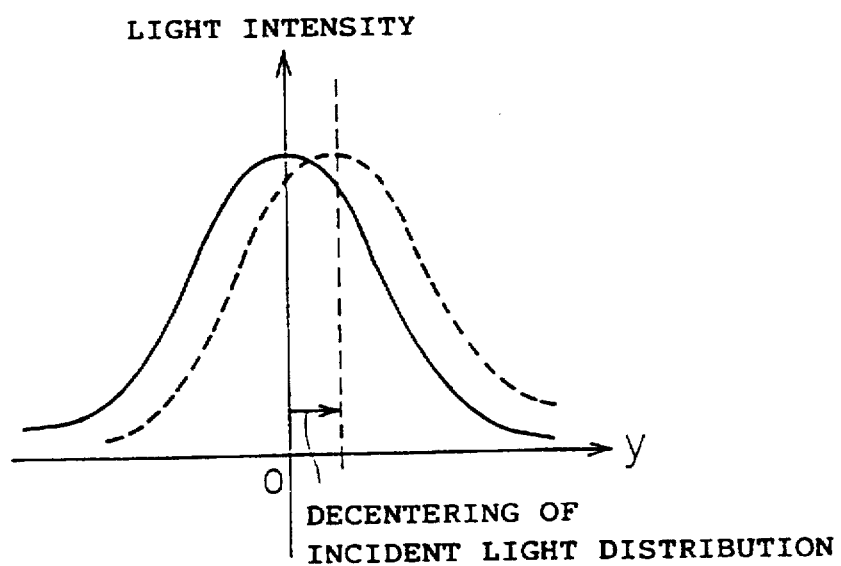
FIG. 8 is a diagram showing a Gaussian distribution.
Figure 6A:
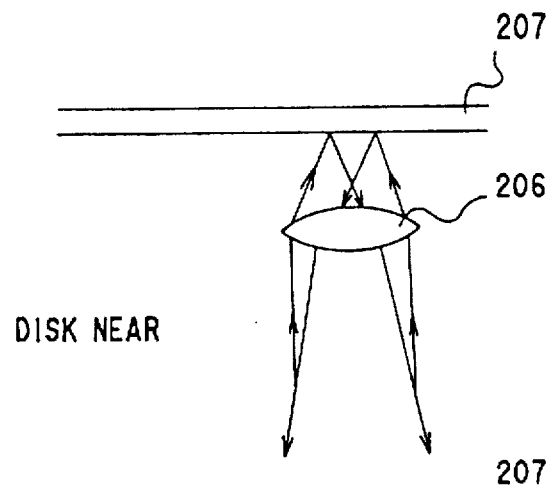
FIGS. 6(a), 6(b) and 6(c) are diagrams showing the relative positional relationship of the objective lens and the disk.
Figure 6B:
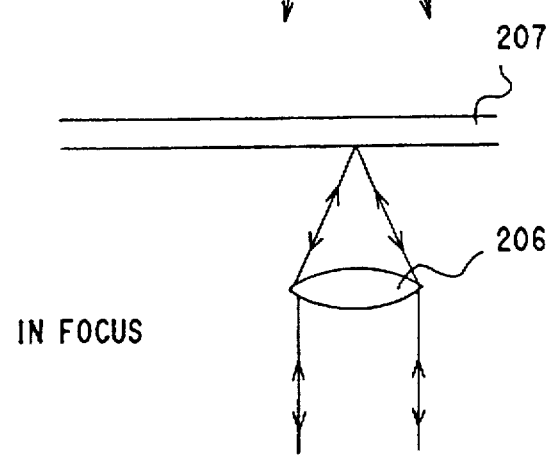
Figure 6C:
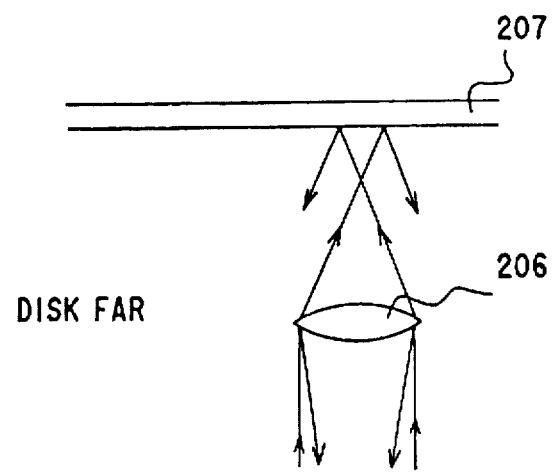
Figure 7A:
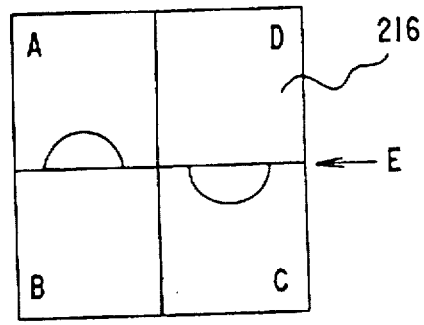
FIGS. 7(a), 7(b) and 7(c) are diagrams showing a spot of a reflected light beam which is formed on the 4-part photodetector.
Figure 7B:
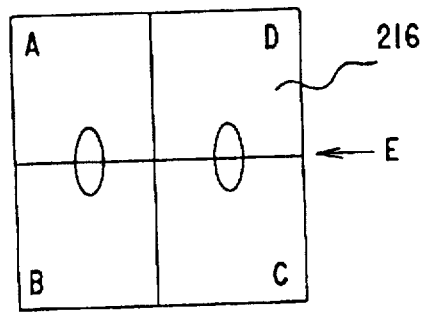
Figure 7C:
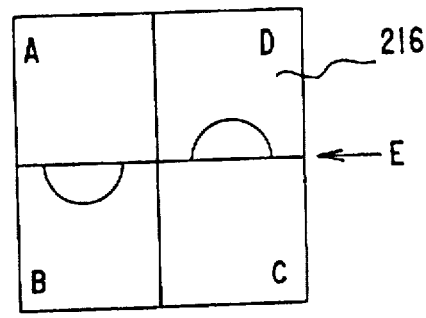

FIG. 13 shows simulation results describing the relationship of the focal position and the focal error signal FES in the prior art shown in FIG. 4. In FIG. 13, a bold solid line indicates a case where a detector shift is 0, a solid line indicates a case where the detector shift is +10 μm, a dotted line indicates a case where the detector shift is +20 μm, a bold dotted line indicates a case where the detector shift is −10 μm, and a bold and fine dotted line indicates a case where the detector shift is −20 μm. The "detector shift" refers to the shift of the division line E of the 4-part photodetector 216 in the y-direction in FIG. 4, and an upward shift in FIG. 4 is taken as a positive (+) shift and a downward shift in FIG. 4 is taken as a negative (−) shift.

In FIG. 13, (a) shows a case where the mounting error of the composite prism 215 is 5%, (b) shows a case where the mounting error is 10%, (c) shows a case where the inclination angle θ of the light beam emitted from the laser diode 201 is 0.5°, and (d) shows a case where the inclination angle θ of the light beam emitted from the laser diode 201 is 1.0°. The case where the inclination angle θ is 0.5° corresponds to the case where the shift of the light beam from the optical axis at the objective lens 206 is 0.25 mm, and the case where the inclination angle θ is 1.0° corresponds to the case where the shift of the light beam from the optical axis at the objective lens 206 is 0.50 mm. Accordingly, if the detector shift indicated by the dotted line in FIG. 13 (a) is +20 μm, for example, it may be seen that a focal offset of approximately 2.0 μm is generated.

On the other hand, FIG. 14 shows simulation results describing the relationship of the focal position and the focal error signal FES in the first embodiment shown in FIG. 9 or the third embodiment shown in FIG. 11. In FIG. 14, a bold solid line indicates a case where the detector shift is 0, a solid line indicates a case where the detector shift is +10 μm, a dotted line indicates a case where the detector shift is +20 μm, a bold dotted line indicates a case where the detector shift is −10 μm, and a bold and fine dotted line indicates a case where the detector shift is −20 μm.

In FIG. 14, (a) shows a case where the mounting error of the composite prism 15 or 15A is 5%, (b) shows a case where the mounting error is 10%, (c) shows a case where the inclination angle θ of the light beam emitted from the laser diode 201 is 0.5°, and (d) shows a case where the inclination angle θ of the light beam emitted from the laser diode 201 is 1.0°. The case where the inclination angle θ is 0.50 corresponds to the case where the shift of the light beam from the optical axis at the objective lens 206 is 0.25 mm, and the case where the inclination angle θ is 1.0° corresponds to the case where the shift of the light beam from the optical axis at the objective lens 206 is 0.50 mm. Accordingly, even if the detector shift indicated by the dotted line in FIG. 14 (a) is +20 μm, for example, it may be seen that only an extremely small focal offset of approximately 0.8 μm is generated. In other words, the focal offset is less than one-half the focal offset of the conventional case.

Figure 15:
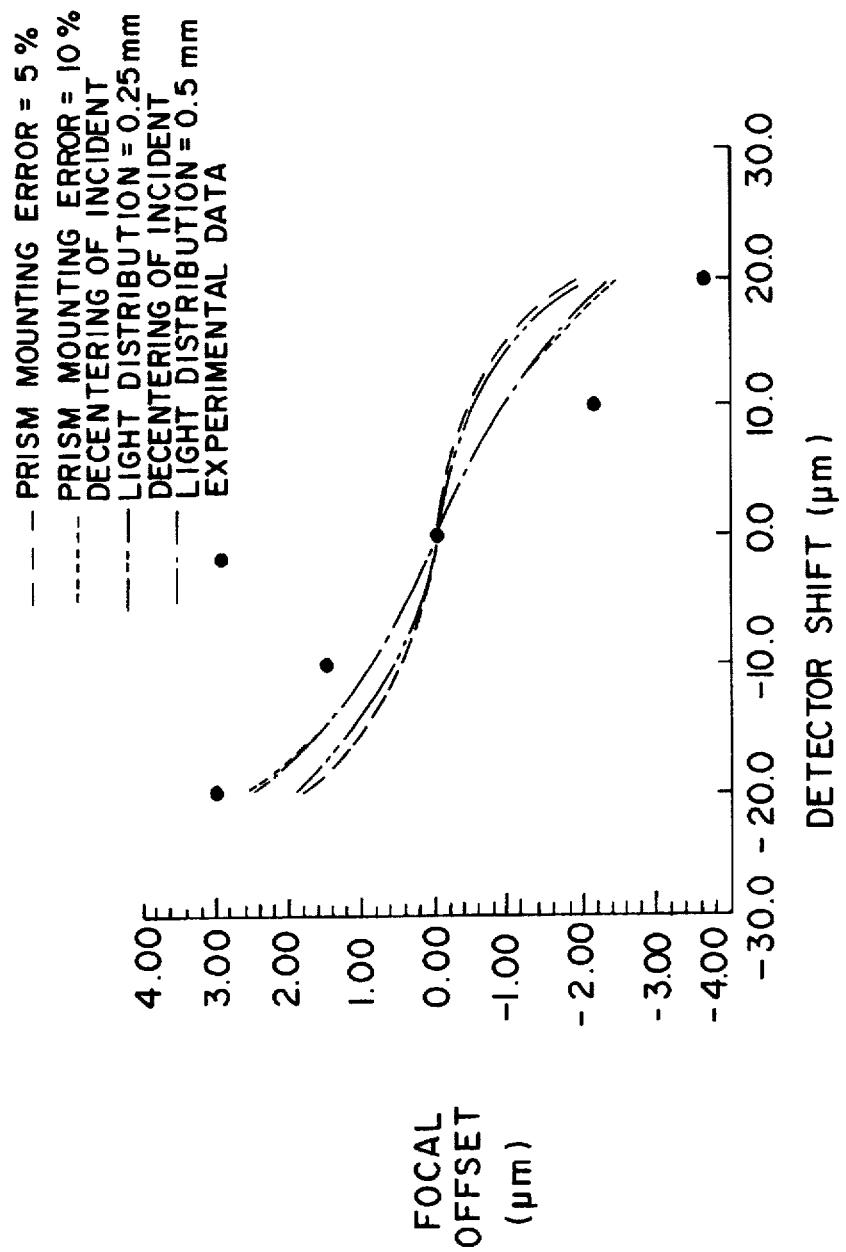
FIG. 15 is a diagram showing the relationship of a detector shift and a focal offset in the prior art.

FIG. 15 is a diagram showing the relationship of the detector shift and the focal offset in the prior art based on the simulation results of FIG. 13. In FIG. 15, black circular marks indicate experimental data.. In FIG. 15, a coarse dotted line shows a case where the mounting error of the composite prism 215 is 5%, a fine dotted line indicates a case where the mounting error of the composite prism 215 is 10%, a two-dot chain line indicates a case where the shift of the light beam from the optical axis at the objective lens 206 is 0.25 mm, and a one-dot chain line indicates a case where the shift of the light beam from the optical axis at the objective lens 206 is 0.50 mm. As may be seen from FIG. 15, the focal offset is generated in each case where the detector shift occurs.

Figure 16:
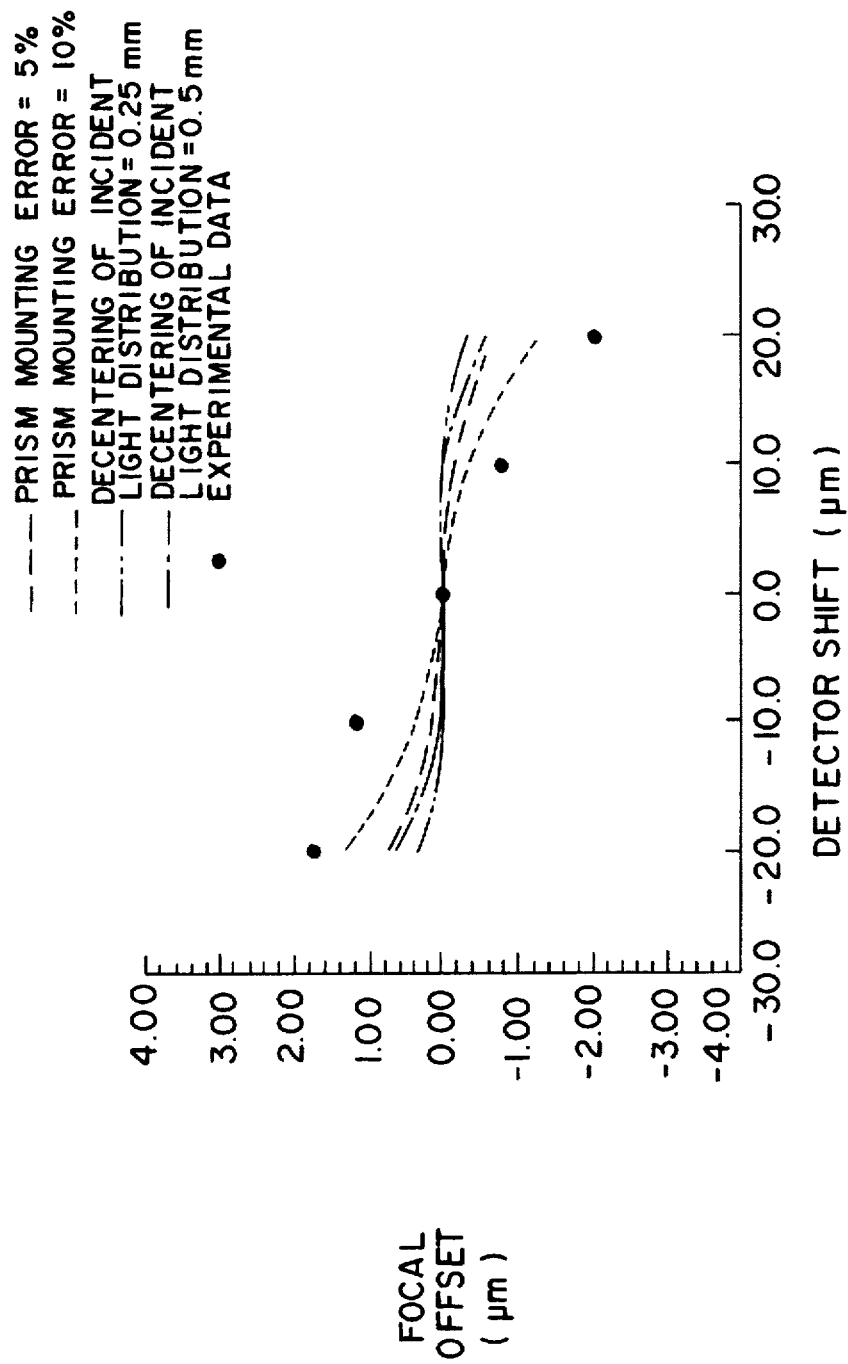
FIG. 16 is a diagram showing the relationship of the detector shift and the focal offset in the first or third embodiment.

On the other hand, FIG. 16 is a diagram showing the relationship of the detector shift and the focal offset in the first or third embodiment based on the simulation results of FIG. 14. In FIG. 16, black circular marks indicate experimental data. In FIG. 16, a coarse dotted line shows a case where the mounting error of the composite prism 15 or 15A is 5%, a fine dotted line indicates a case where the mounting error of the composite prism 15 or 15A is 10%, a two-dot chain line indicates a case where the shift of the light beam from the optical axis at the objective lens 206 is 0.25 mm, and a one-dot chain line indicates a case where the shift of the light beam from the optical axis at the objective lens 206 is 0.50 mm. As may be seen from FIG. 16, the focal offset which is generated is extremely small or approximately 0 in each case where the detector shift occurs. Accordingly, it can be seen that the focal offset in the first or third embodiment is extremely small compared to that of the prior art.

In FIG. 1, the arrangement of the 4-part photodetector 216 along the optical axis must be set approximately to the image formation point position of the condenser lens 212, due to the operating principle of the Foucault technique. On the other hand, the arrangement of the 2-part photodetector 214 along the optical axis must be set at a position shifted from the image formation point position of the condenser lens 212, due to the operating principle of the push-pull technique. In other words, the 2-part photodetector 214 must be set at the so-called far field.

For the above reasons, it is necessary to split the reflected light beam into two by use of the beam splitter 213, and independently provide an optical path which is used to carry out the Foucault technique and an optical path which is used to carry out the push-pull technique. As a result, if the focal error is to be detected using the Foucault technique and the tracking error is to be detected using the push-pull technique, the optical system occupies a relatively large space because of the need to provide two independent optical paths, and furthermore, the number of parts required becomes large.

Accordingly, a description will hereinafter be given of embodiments of the optical information recording/reproducing apparatus according to the present invention which reduce the space of the optical system occupying within the optical information recording/reproducing apparatus and reduce the number of required parts, so that the size and cost of the optical information recording/reproducing apparatus and the optical disk unit using the same can both be reduced.

Figure 17:
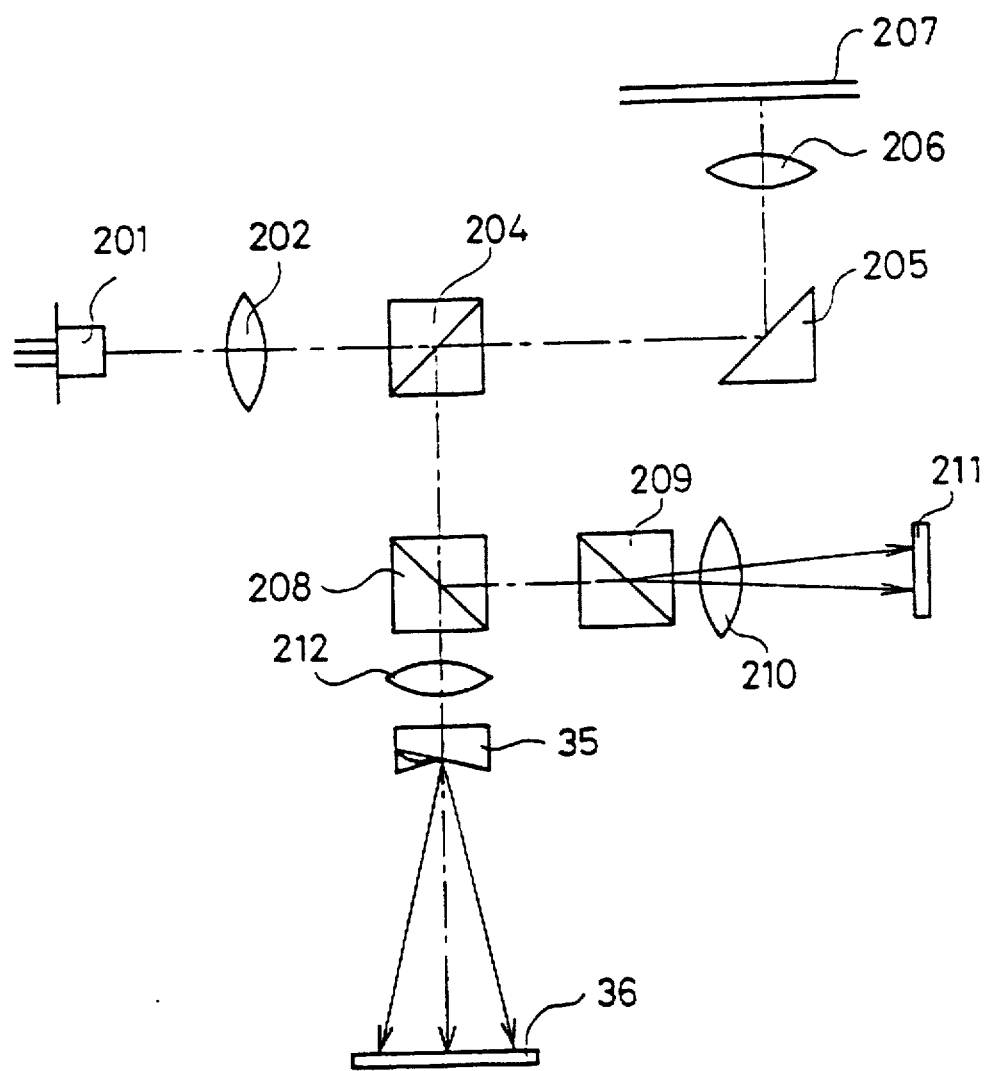
FIG. 17 is a diagram showing a fifth embodiment of the optical information recording/reproducing apparatus according to the present invention.

First, a description will be given of a fifth embodiment of the optical information recording/reproducing apparatus according to the present invention, by referring to FIGS. 17 through 19. In FIG. 17, those parts which are the same as those corresponding parts in FIG. 1 are designated by the same reference numerals, and a description thereof will be omitted.

In this embodiment, it is unnecessary to provide the beam splitter 213 and the 2-part photodetector 214 shown in FIG. 1, as may be seen from FIG. 17. In addition, a composite prism 35 and a photodetector 36 are provided in place of the composite prism 215 and the 4-part photodetector 216. In other words, this embodiment uses the central part of the reflected light beam which is not used in the first through fourth embodiments, for detecting the tracking error by the push-pull technique.

Figure 18A:
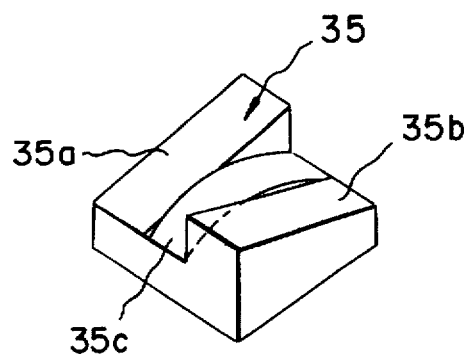
FIGS. 18(a) and 18(b) are diagrams showing a composite prism of the fifth embodiment on an enlarged scale.
Figure 18B:
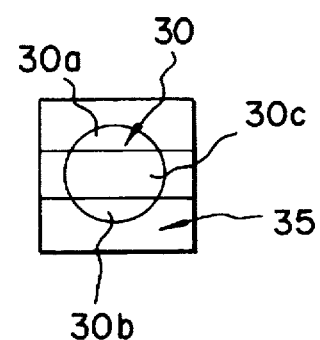

FIG. 18 shows the composite prism 35 on an enlarged scale. In FIG. 18, (a) shows a perspective view of the composite prism 35, and (b) shows a plan view of the composite prism 35. As shown in FIG. 18, the composite prism 35 includes a tapered first and second parts 35a and 35b, and a third part 35c which has a convex surface with a slight curvature. Hence, a reflected light beam 30 which is obtained via the beam splitter 208 is split into three light beams 30a, 30b and 30c.

Figure 19:
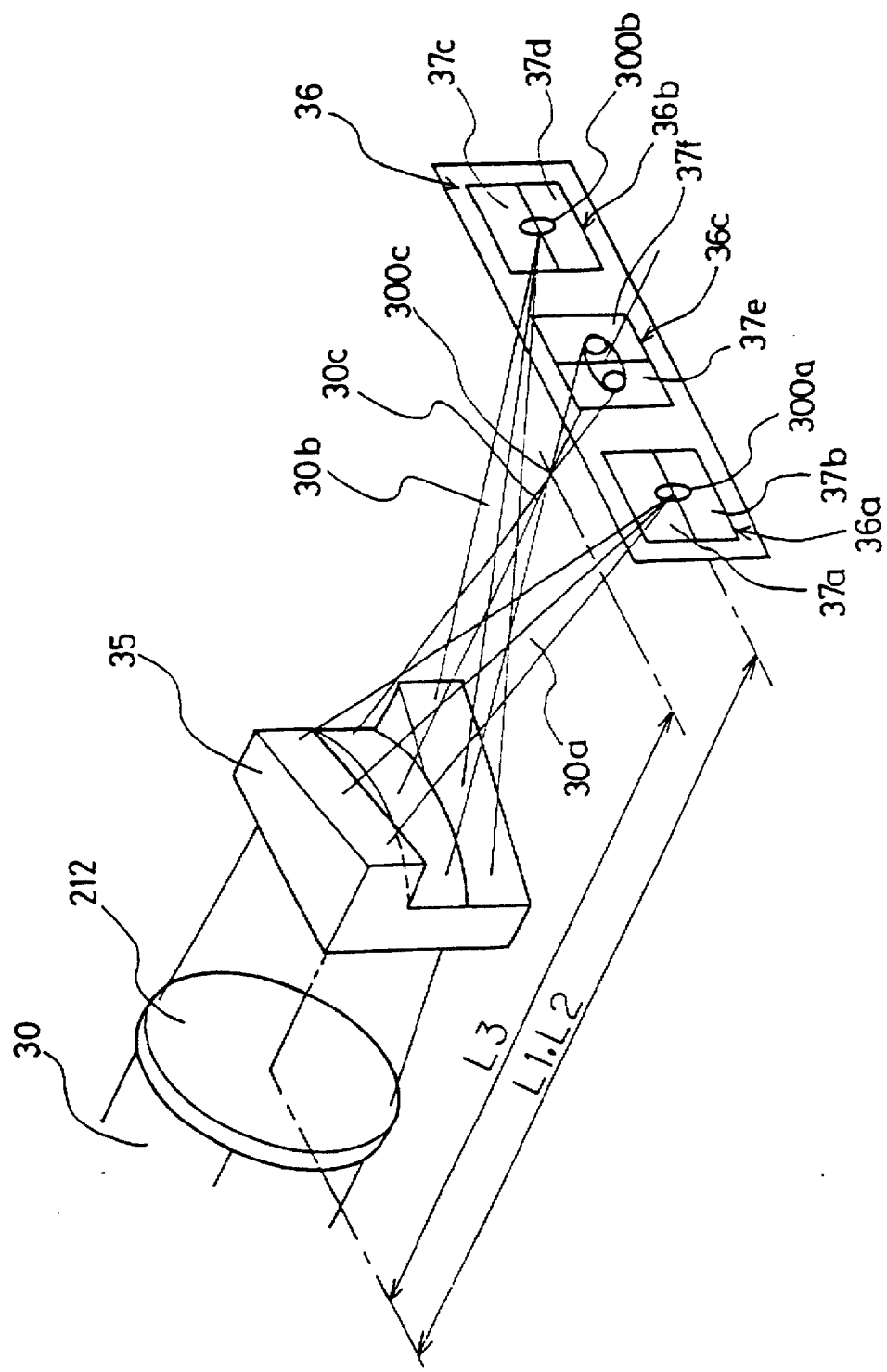
FIG. 19 is a perspective view showing an essential part of the fifth embodiment.

FIG. 19 is a perspective view, on an enlarged scale, showing an essential part of FIG. 17. The photodetector 36 includes a first photodetector 36a, a second photodetector 36b, and a third photodetector 36c. The first photodetector 36a includes photodetectors 37a and 37b. The second photodetector 36b includes photodetectors 37c and 37d. The third photodetector 36c includes photodetectors 37e and 37f.

Out of the reflected light beam 30 which is refracted and condensed via the condenser lens 212, the light beam 30a which is transmitted through the first part 35a is deflected depending on the taper angle of the first part 35a and is irradiated on the first photodetector 36a of the photodetector 36, while the light beam 30b which is transmitted through the second part 35b is deflected depending on the taper angle of the second part 35b and is irradiated on the second photodetector 36b of the photodetector 36. In addition, the light beam 30c which is transmitted through the third part 35c is refracted depending on the curvature of the third part 35c and is irradiated on the third photodetector 36c of the photodetector 36. In other words, the light beams 30a and 30b are only subjected to the refraction function of the condenser lens 212, but the light beam 30c is subjected to the refraction function of the condenser lens 212 and the third part 35c itself. Therefore, image formation points 300a and 300b of the respective light beams 30a and 30b are different from an image formation point 300c of the light beam 30c. That is, distances L1 and L2 from the condenser lens 212 to the image formation points 300a and 300b of the respective light beams 30a and 30b are different from a distance L3 from the condenser lens 212 to the image formation point 300c of the light beam 30c.

In FIG. 19, the photodetector 36 is arranged on a plane which is perpendicular to the optical axis of the reflected light beam 30 and includes the image formation points 300a and 300b. Because of this arrangement, the first and second photodetectors 36a and 36b which are used to generate the focal error signal FES based on the Foucault technique are respectively provided at the positions of the image formation points 300a and 300b of the light beams 30a and 30b. On the other hand, the third photodetector 36c which is used to generate the tracking error signal TES based on the push-pull technique is provided at a position deviated from the position of the image formation point 300c of the light beam 30c. Hence, it is possible to generate the focal error signal FES using the Foucault technique and to generate the tracking error signal TES using the push-pull technique by use of a simple optical system. The generation itself of the focal error signal FES and the tracking error signal TES may be made similarly to the prior art, and a description thereof will be omitted.

The requirement is that the distances L1 and L2 between the condenser lens 212 and the respective image formation points 300a and 300b of the light beams 30a and 30b are different from the distance L3 between the condenser lens 212 and the image formation point 300c of the light beam 30c, and the construction and arrangement of the composite prism 35 and the photodetector 36 are not limited to those of the above embodiment.

Figure 20A:
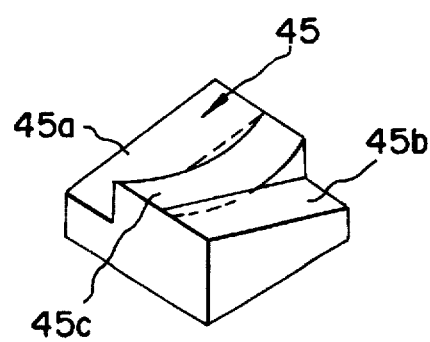
FIGS. 20(a) and 20(b) are diagrams showing a composite prism of a sixth embodiment of the optical information recording/reproducing apparatus according to the present invention on an enlarged scale.
Figure 20B:
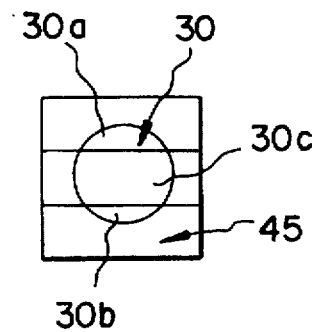
Figure 21:
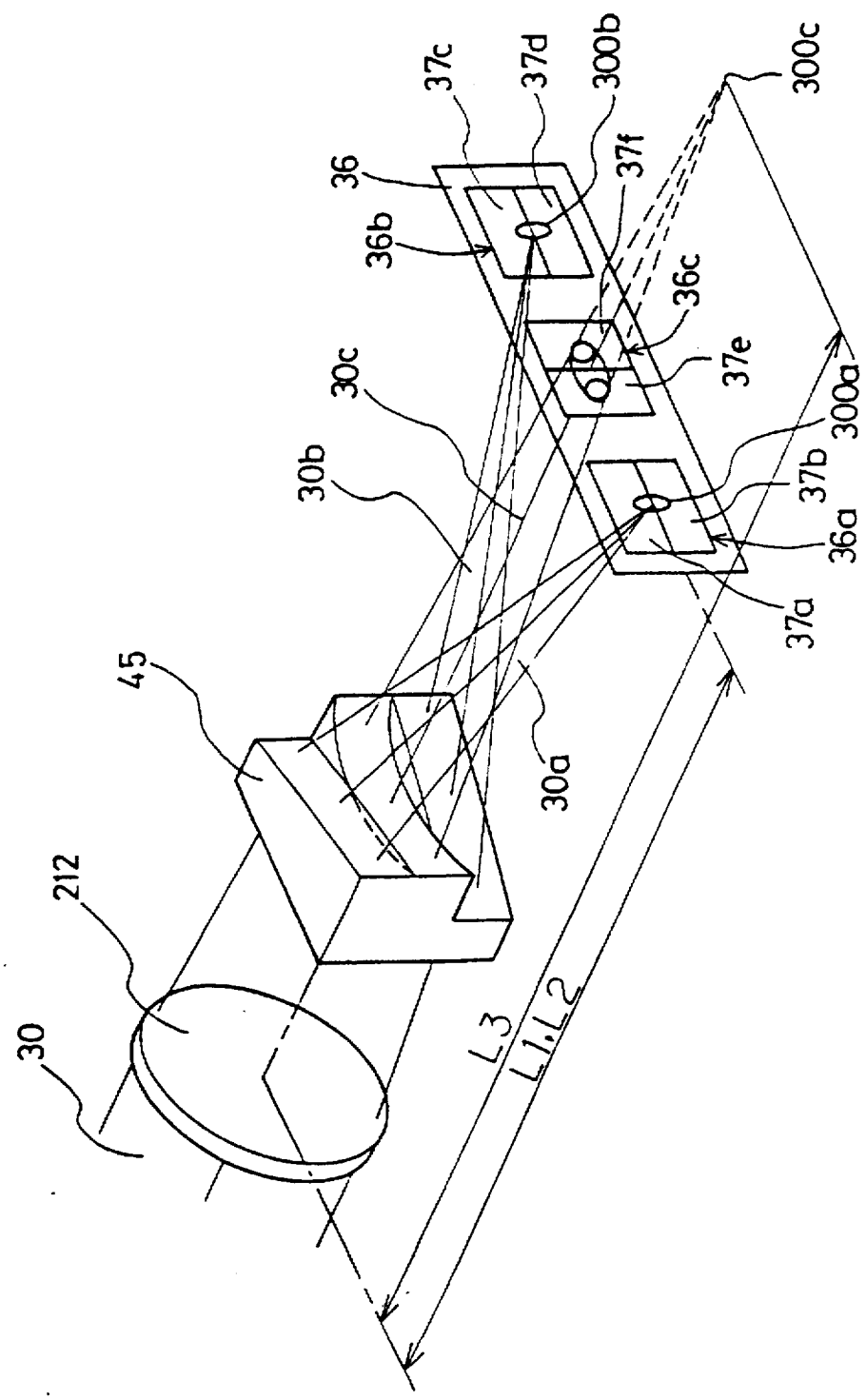
FIG. 21 is a perspective view showing an essential part of the sixth embodiment.

Next, a description will be given of a sixth embodiment of the optical information recording/reproducing apparatus according to the present invention, by referring to FIGS. 20 and 21. In FIGS. 20 and 21, those parts which are the same as those corresponding parts in FIGS. 18 and 19 are designated by the same reference numerals, and a description thereof will be omitted.

In this embodiment, a composite prism 45 shown in FIG. 20 is used in place of the composite prism shown in FIG. 18.

FIG. 20 shows the composite prism 45 on an enlarged scale. In FIG. 20, (a) shows a perspective view of the composite prism 45, and (b) shows a plan view of the composite prism 45. As shown in FIG. 20, the composite prism 45 includes tapered first and second parts 45a and 45b, and a third part 45c which has a concave surface with a slight curvature. Hence, a reflected light beam 30 which is obtained via the beam splitter 208 is split into three light beams 30a, 30b and 30c.

FIG. 21 is a perspective view, on an enlarged scale, showing an essential part of this embodiment. The photodetector 36 is the same as the photodetector 36 used in the fifth embodiment.

Out of the reflected light beam 30 which is refracted and condensed via the condenser lens 212, the light beam 30a which is transmitted through the first part 45a is deflected depending on the taper angle of the first part 45a and is irradiated on the first photodetector 36a of the photodetector 36, while the light beam 30b which is transmitted through the second part 45b is deflected depending on the taper angle of the second part 45b and is irradiated on the second photodetector 36b of the photodetector 36. In addition, the light beam 30c which is transmitted through the third part 45c is refracted depending on the curvature of the third part 45c and is irradiated on the third photodetector 36c of the photodetector 36. In other words, the light beams 30a and 30b are only subjected to the refraction function of the condenser lens 212, but the light beam 30c is subjected to the refraction function of the condenser lens 212 and the third part 45c itself. Therefore, image formation points 300a and 300b of the respective light beams 30a and 30b are different from an image formation point 300c of the light beam 30c. That is, distances L1 and L2 from the condenser lens 212 to the image formation points 300a and 300b of the respective light beams 30a and 30b are different from a distance L3 from the condenser lens 212 to the image formation point 300c of the light beam 30c.

In other words, the image formation point 300c of the light beam 30c is located between the composite prism 35 and the photodetector 36 in the fifth embodiment, but the image formation point 300c of the light beam 30c in this embodiment is located beyond the photodetector 36 in FIG. 21 along the traveling direction of the light beam.

In FIG. 21, the photodetector 36 is arranged on a plane which is perpendicular to the optical axis of the reflected light beam 30 and includes the image formation points 300a and 300b, similarly to the fifth embodiment shown in FIG. 19. Because of this arrangement, the first and second photodetectors 36a and 36b which are used to generate the focal error signal FES based on the Foucault technique are respectively provided at the positions of the image formation points 300a and 300b of the light beams 30a and 30b. On the other hand, the third photodetector 36c which is used to generate the tracking error signal TES based on the push-pull technique is provided at a position deviated from the position of the image formation point 300c of the light beam 30c. Hence, it is possible to generate the focal error signal FES using the Foucault technique and to generate the tracking error signal TES using the push-pull technique by use of a simple optical system.

Figure 22A:
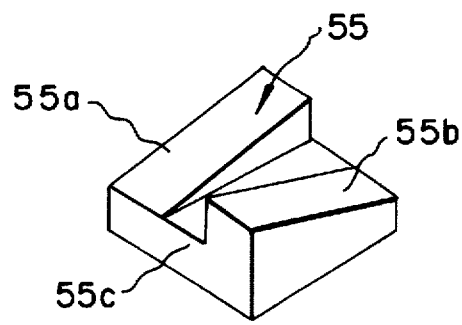
FIGS. 22(a) and 22(b) are diagrams showing a composite prism of a seventh embodiment of the optical information recording/reproducing apparatus according to the present invention on an enlarged scale.
Figure 22B:
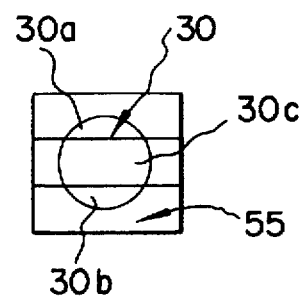

Next, a description will be given of a seventh embodiment of the optical information recording/reproducing apparatus according to the present invention, by referring to FIGS. 22 and 23. In FIGS. 22 and 23, those parts which are the same as those corresponding parts in FIGS. 18 and 19 are designated by the same reference numerals, and a description thereof will be omitted.

In this embodiment, a composite prism 55 and a photodetector 56 shown in FIG. 23 are used in place of the composite prism 35 and the photodetector 36 shown in FIG. 18.

FIG. 22 shows the composite prism 55 on an enlarged scale. In FIG. 22, (a) shows a perspective view of the composite prism 55, and (b) shows a plan view of the composite prism 55. As shown in FIG. 22, the composite prism 55 includes tapered first and second parts 55a and 55b, and a flat third part 55c which has not taper. Hence, a reflected light beam 30 which is obtained via the beam splitter 208 is split into three light beams 30a, 30b and 30c.

FIG. 23 is a perspective view, on an enlarged scale, showing an essential part of this embodiment. The photodetector 56 includes a first photodetector 56a, a second photodetector 56b, and a third photodetector 56c. The first photodetector 56a includes photodetectors 37a and 38b. The second photodetector 56b includes photodetectors 37c and 37d. The third photodetector 56c includes photodetectors 37e and 37f. The third photodetector 56c is arranged on a plane different from a plane on which the first and second photodetectors 56a and 56b are arranged.

Out of the reflected light beam 30 which is refracted and condensed via the condenser lens 212, the light beam 30a which is transmitted through the first part 55a is deflected depending on the taper angle of the first part 55a and is irradiated on the first photodetector 56a of the photodetector 56, while the light beam 30b which is transmitted through the second part 55b is deflected depending on the taper angle of the second part 55b and is irradiated on the second photodetector 56b of the photodetector 56. In addition, the light beam 30c which is transmitted through the third part 55c is transmitted as it is and is irradiated on the third photodetector 56c of the photodetector 56. In other words, all of the light beams 30a, 30b and 30c are only subjected to the refraction function of the condenser lens 212. Therefore, image formation points 300a, 300b and 300c of the respective light beams 30a, 30b and 30c are all located on the same plane. That is, distances L1, L2 and L3 from the condenser lens 212 to the image formation points 300a, 300b and 300c of the respective light beams 30a, 30b and 30c are the same. However, since the third photodetector 56c in this embodiment is arranged on the plane which is different from the plane on which the first and second photodetectors 56a and 56b are arranged, the image formation point 300c of the light beam 30c and the position of the third photodetector 56c do not match.

In other words, the image formation point 300c of the light beam 30c is located between the composite prism 35 and the photodetector 36 in the fifth embodiment, but the image formation point 300c of the light beam 30c in this embodiment is located beyond the third photodetector 56c in FIG. 23 along the traveling direction of the light beam.

In FIG. 23, the first and second photodetectors 56a and 56b of the photodetector 56 are arranged on a plane which is perpendicular to the optical axis of the reflected light beam 30 and includes the image formation points 300a and 300b, similarly to the fifth embodiment shown in FIG. 19. Because of this arrangement, the first and second photodetectors 56a and 56b which are used to generate the focal error signal FES based on the Foucault technique are respectively provided at the positions of the image formation points 300a and 300b of the light beams 30a and 30b. On the other hand, the third photodetector 56c which is used to generate the tracking error signal TES based on the push-pull technique is provided at a position deviated from the position of the image formation point 300c of the light beam 30c. Hence, it is possible to generate the focal error signal FES using the Foucault technique and to generate the tracking error signal TES using the push-pull technique by use of a simple optical system.

The generation of the focal error signal FES based on the Foucault technique is not limited to that of the embodiment using two light beams, and it is of course possible to use more than two light beams for the generation of the focal error signal FES. Similarly, the generation of the tracking error signal TES based on the push-pull technique is not limited to that of the embodiment using one light beam, and it is of course possible to use more than one light beam for the generation of the tracking error signal TES.

Figure 24:
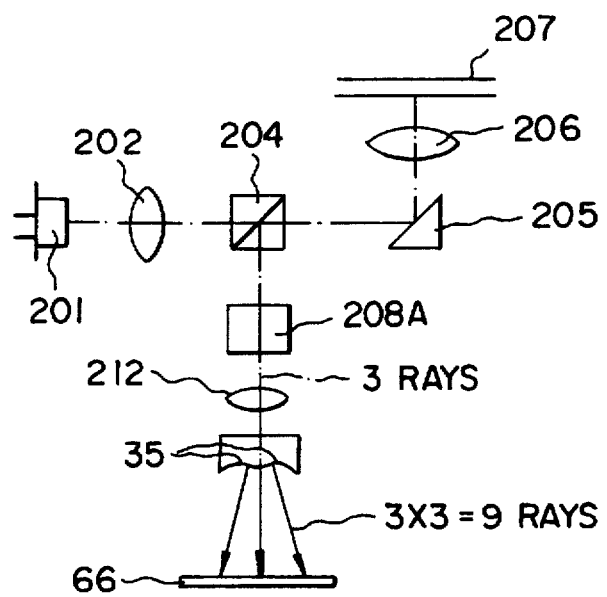
FIG. 24 is a diagram showing an eighth embodiment of the optical information recording/reproducing apparatus according to the present invention.
Figure 25:
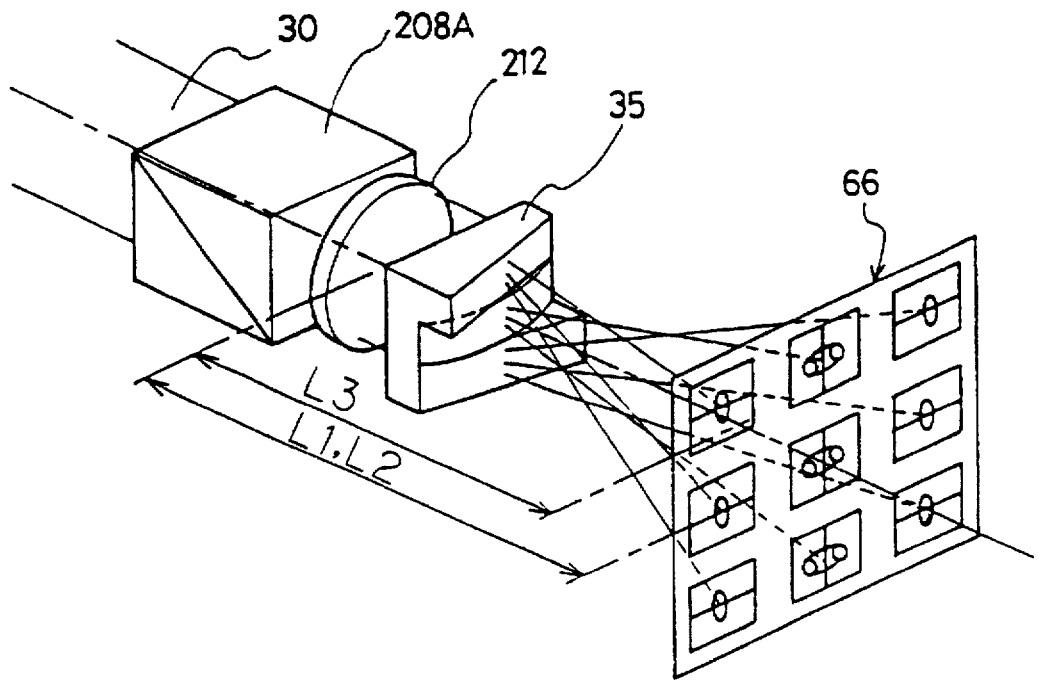
FIG. 25 is a perspective view showing an essential part of the eighth embodiment.

Next, a description will be given of an eighth embodiment of the optical information recording/reproducing apparatus according to the present invention, by referring to FIGS. 24, 25 and 26. In FIGS. 24 and 25, those parts which are the same as those corresponding parts in FIG. 17 are designated by the same reference numerals, and a description thereof will be omitted.

In this embodiment, an analyzer 208A shown in FIGS. 24 and 25 is used together with the composite prism 35 and the photodetector 36 shown in FIG. 17.

For example, an analyzer 21 disclosed in a Japanese Laid-Open Patent Application No.63-127436 may be used as the analyzer 208A. In this eighth embodiment, the light beam is split into three light beams by the analyzer 208A, and each of the three light beams are further split into three light beams by the composite prism 35, thereby resulting in nine (3×3=9) light beams being output from the composite prism 35. The nine light beams from the composite prism 35 are irradiated on corresponding ones of nine photodetectors 66a through 66i which form the photodetector 66.

Figure 26:
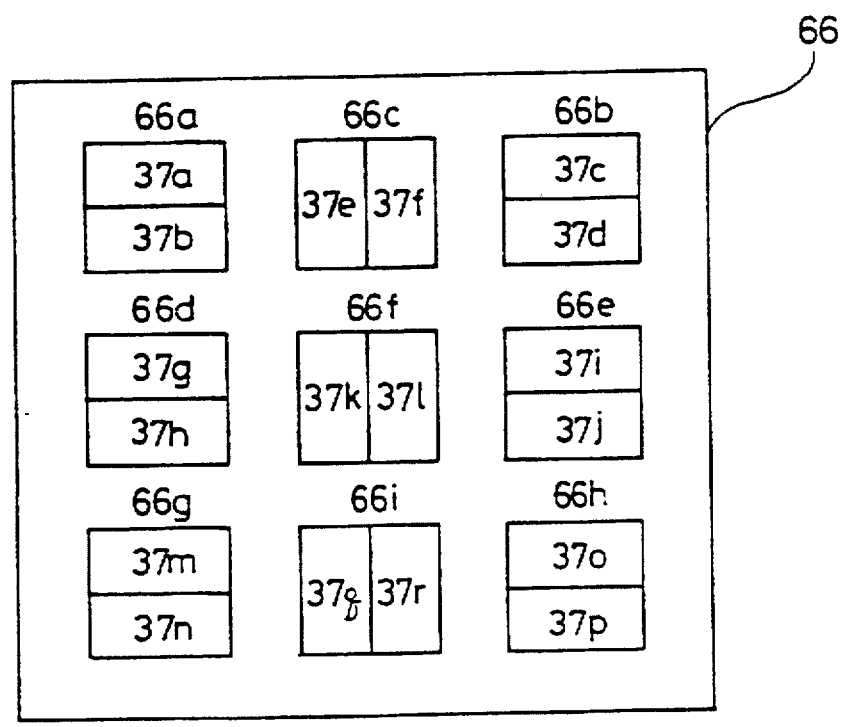
FIG. 26 is a plan view showing a photodetector of the eighth embodiment.

FIG. 26 shows a plan view of the photodetector 66. The focal error signal FES can be generated according to the Foucault technique based on outputs of the photodetectors 66a, 66b, 66d, 66e, 66g and 66h of the photodetector 66. The photodetectors 66a, 66d and 66g receive the three light beams from the first part of the composite prism 35, while the photodetectors 66b, 66e and 66h receive the three light beams from the second part of the composite prism 35. The image formation points of these six light beams match the positions of the photodetectors 66a, 66b, 66d, 66e, 66g and 66h. On the other hand, the tracking error signal TES can be generated according to the push-pull technique based on outputs of the photodetectors 66c, 66f and 66i. The photodetectors 66c, 66f and 66i receive the three light beams from the third part of the composite prism 35. The image formation points of these three light beams are deviated from the positions of the photodetectors 66c, 66f and 66i.

As shown in FIG. 26, the photodetector 66a includes photodetector parts 37a and 37b, the photodetector 66b includes photodetector parts 37c and 37d, . . . , and the photodetector 66i includes photodetector parts 37q and 37r. Accordingly, if the outputs of these photodetector parts 37a through 37i are denoted by the same reference numerals as these parts, the focal error signal FES using the Foucault technique can be generated based on the following formula (3) by calculation.

$$FES=[(37a)+(37g)+(37m)+(37d)+(37j)+(37p)]-[(37b)+(37h)+(37n)+(37c)+(37i)+(37o)] \quad (3)$$

In addition, the tracking error signal using the push-pull technique can be generated based on the following formula (4) by calculation.

$$TES=[(37e)+(37k)+(37q)]-[(37f)+(37l)+(37r)] \quad (4)$$

Furthermore, by the function of the analyzer 208A, a magneto-optic signal (information signal) RF which is recorded on the disk 207 can be reproduced based on the following formula (5) by calculation.

$$RF=[(37a)+(37b)+(37e)+(37f)+(37c)+(37d)]-[(37m)+(37n)+(37q)+(37r)+(37o)+(37p)] \quad (5)$$

According to the eighth embodiment, the magneto-optic signal detection system and the servo signal detection signal can be provided approximately on a single optical path, and it is therefore possible to further reduce both the size and cost of the optical information recording/reproducing apparatus compared to the fifth through seventh embodiments. As is evident from a comparison of FIGS. 17 and 24, the Wollaston prism 209, the lens 210 and the 2-part photodetector 211 required in FIG. 17 are omitted in FIG. 24.

In the fifth through eighth embodiments, the image formation point of the light beam used to generate the focal error signal FES according to the Foucault technique and the image formation point of the light beam used to generate the tracking error signal TES according to the push-pull technique are made mutually different by use of the composite prism. However, the method of making the image formation points of the light beams mutually different is not limited to that using the composite prism, and it is also possible to use a hologram optical element, for example.

Figure 27:
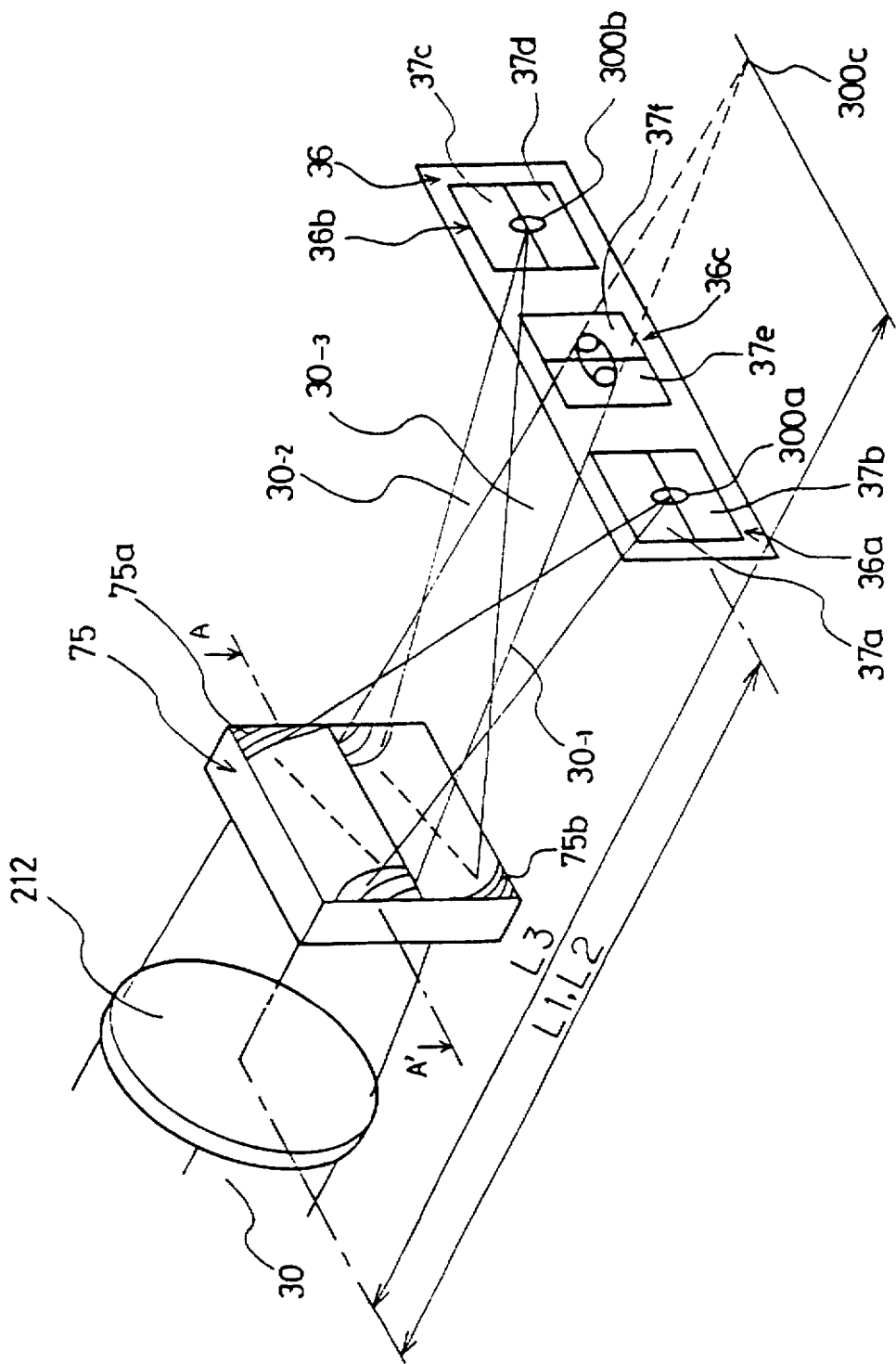
FIG. 27 is a perspective view showing an essential part of a ninth embodiment of the optical information recording/reproducing apparatus according to the present invention.
Figure 28:
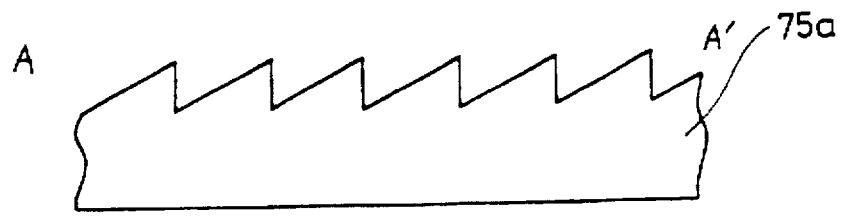
FIG. 28 is a cross sectional view showing an essential part of a hologram optical element of the ninth embodiment.

Next, a description will be given of a ninth embodiment of the optical information recording/reproducing apparatus according to the present invention, by referring to FIGS. 27 and 28. In FIGS. 27 and 28, those parts which are the same as those corresponding parts in FIG. 19 are designated by the same reference numerals, and a description thereof will be omitted.

In this embodiment, a hologram optical element 75 shown in FIG. 27 is used in place of the composite prism 35 shown in FIG. 19.

FIG. 27 is a perspective view showing an essential part of this embodiment on an enlarged scale. The hologram optical element 75 includes first and second parts 75a and 75b. The cross sectional shape of the first part 75a along a line A-A' in FIG. 27 is a sawtooth grating as shown in FIG. 28. The second part 75b has a cross sectional shape similar to that of the first part 75a, but the cross sectional shape of the second part 75b is in point symmetry to that of the first part 75a with respect to the center of the hologram optical element 75. The sawtooth gratings of the first and second parts 75a and 75b are sometimes also referred to as blazed gratings.

The hologram optical element 75 separates the reflected light beam 30 into 0th order diffracted light, ±1st order diffracted lights, and high-order diffracted lights of ±2nd order or higher. In this embodiment, the cross sectional shape of the hologram optical element 75 is designed so that the effect of high-order diffracted lights of ±2nd order or higher are small when detecting the light. With regard to the ±1st order diffracted lights, the above described sawtooth cross sectional shapes of the first and second parts 75a and 75b are designed so that, for example, the quantity of the emitted +1st order diffracted light is larger than that of the emitted −1st order diffracted light, that is, so that the effects of the −1st order diffracted light which is a divergent ray is minimized.

Accordingly, this embodiment uses a +1st order diffracted light 30-1 which is diffracted by the grating of the first part 75a, a +1st order diffracted light 30-2 which is diffracted by the grating of the second part 75b, and a 0th order diffracted light 30-3 which passes through the first and second parts 75a and 75b without being affected by the gratings thereof. In addition, the grating patterns of the first and second parts 75a and 75b are designed such that the +1st order diffracted light 30-1 which is emitted from the first part 75a is refracted twice via the condenser lens 212 and the first part 75a before being imaged at an image formation point 300a, and the +1st order diffracted light 30-2 which is emitted from the second part 75b is refracted twice via the condenser lens 212 and the second part 75b before being imaged at an image formation point 300b. On the other hand, since the 0th order diffracted light 30-3 passes through the hologram optical element 75 as it is without being affected by the grating patterns, the 0th order diffracted light 30-3 is refracted only by the condenser lens 212 and is imaged at an image formation point 300c.

In FIG. 27, the photodetector 36 is arranged on a plane which is perpendicular to the optical axis of the reflected light beam and includes the image formation points 300a and 300b. Because of this arrangement, the first and second photodetectors 36a and 36b which are used to generate the focal error signal FES based on the Foucault technique are respectively provided at the positions of the image formation points 300a and 300b of the +1st order diffracted lights 30-1 and 30-2. On the other hand, the third photodetector 36c which is used to generate the tracking error signal TES based on the push-pull technique is provided at a position deviated from the position of the image formation point 300c of the 0th order diffracted light 30-3. Hence, it is possible to generate the focal error signal FES using the Foucault technique and to generate the tracking error signal TES using the push-pull technique by use of a simple optical system. The generation itself of the focal error signal FES and the tracking error signal TES may be made similarly to the prior art, and a description thereof will be omitted.

The requirement is that the distances L1 and L2 between the condenser lens 212 and the respective image formation points 300a and 300b of the +1st order diffracted lights 30-1 and 30-2 are different from the distance L3 between the condenser lens 212 and the image formation point 300c of the 0th order diffracted light 30-3, and the construction and arrangement of the hologram optical element 75 and the photodetector 36 are not limited to those of this embodiment.

Next, a description will be given of the functions of the hologram optical element 75 by itself, that is, for the case where no condenser lens 212 exists, by referring to FIGS. 29 through 31.

As described above, the hologram optical element 75 includes the first and second parts 75a and 75b which are provided with independent patterns for deflecting, converging and diverging the light. More particularly, the patterns of the first and second parts 75a and 75b are respectively set so that the +1st order diffracted light 30-1 from the first part 75a converges to a point P'(−x, 0) and the +1st order diffracted light 30-2 from the second part 75b converges to a point P(x, 0). Points P and P' are located on a plane π which is a distance f away from the hologram optical element 75 along the optical axis. In other words, the function of the first part 75a is to image the parallel incident light at a focal point O at a focal distance f, and to converge the light to the point P' by deflecting the light by a distance x in the negative x-direction.

Figure 30:
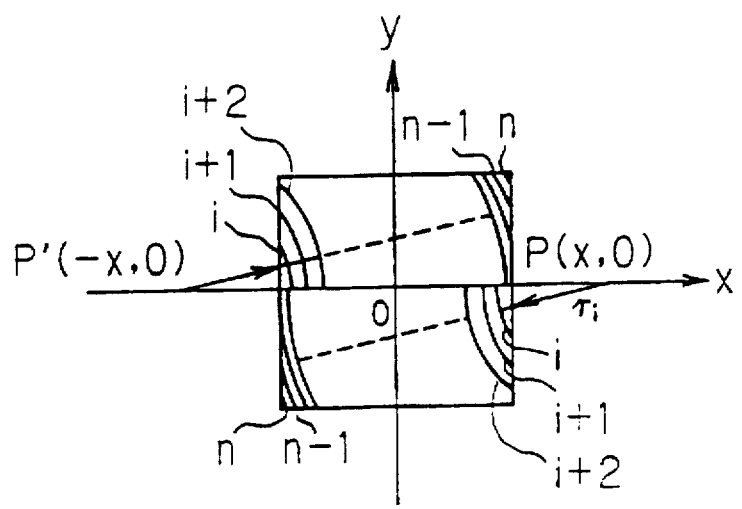
FIG. 30 is a plan view for explaining the construction of the hologram optical element.

FIG. 30 shows a plan view of the hologram optical element 75. Since the patterns of the first and second parts 75a and 75b are in point symmetry with respect to the origin O in FIG. 30, the pattern of the first part 75a, for example, is made up of concentric grooves or projections having a center at the point P'(−x, 0). A radius $r_i$ of an ith concentric groove or projection can be obtained from the following formula (6), where $\lambda$ denotes the wavelength of the light output from the light source, $$r_i = \sqrt{(2 \cdot f \cdot \lambda \cdot i)} \tag{6}$$

In addition, the cross sectional shape of the first part 75a is determined so that the ratios of the 0th order diffracted light and the +1st order diffracted light with respect to the total quantity of light become predetermined values.

In the above ninth embodiment, the cross sectional shape of the hologram optical element 75 is designed so that the effects of the high-order diffracted lights of ±2nd order diffracted lights or higher are small when detecting the light. In addition, with respect to the ±1st order diffracted lights, the cross sectional shapes of the first and second parts 75a and 75b of the hologram optical element 75 are set to the sawtooth shape shown in FIG. 28 so that the quantity of the emitted +1st order diffracted light is larger than that of the emitted −1st order diffracted light, that is, so that the effects of the −1st order diffracted light which is a divergent ray are minimized. However, it is of course possible to design the cross sectional shape of the hologram optical element 75 so that the quantity of the emitted −1st order diffracted light is larger than that of the emitted +1st order diffracted light, that is, so that the −1st order diffracted light which is a divergent ray is positively used and the effects of the +1st order diffracted light are minimized.

Figure 31:
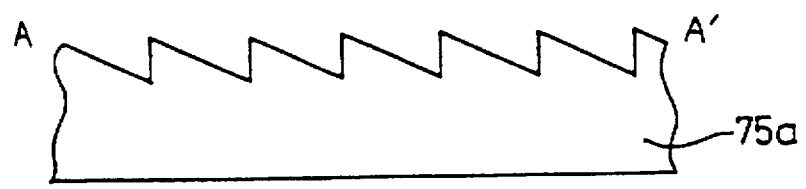
FIG. 31 is a cross sectional view showing an essential part of a hologram optical element of a tenth embodiment of the optical information recording/reproducing apparatus according to the present invention.

In a tenth embodiment of the optical information recording/reproducing apparatus according to the present invention, the hologram optical element 75 used has a cross sectional shape shown in FIG. 31 along the line A-A' in FIG. 27. An essential part of this embodiment is essentially the same as FIG. 27, and an illustration thereof will be omitted. Contrary to the ninth embodiment, this embodiment positively uses the −1st order diffracted lights. For this reason, the first and second photodetectors 36a and 36b for generating the focal error signal FES based on the Foucault technique are provided at the image formation points of the −1st order diffracted lights. On the other hand, the third photodetector 36c for generating the tracking error signal TES based on the push-pull technique is provided at a position deviated from the image formation point 300c of the 0th order diffracted light, that is, between the hologram optical element 75 and the photodetector 36. As a result, it is possible to generate the focal error signal FES using the Foucault technique and to generate the tracking error signal TES using the push-pull technique by use of a simple optical system.

Figure 29:
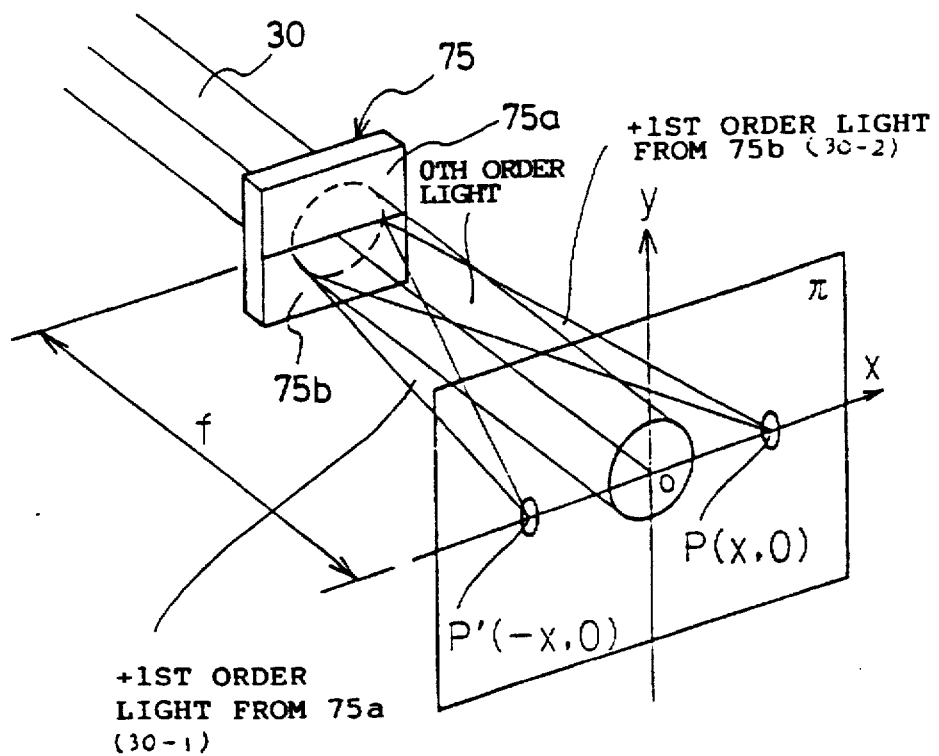
FIG. 29 is a perspective view for explaining the functions of the hologram optical element by itself.
Figure 32:
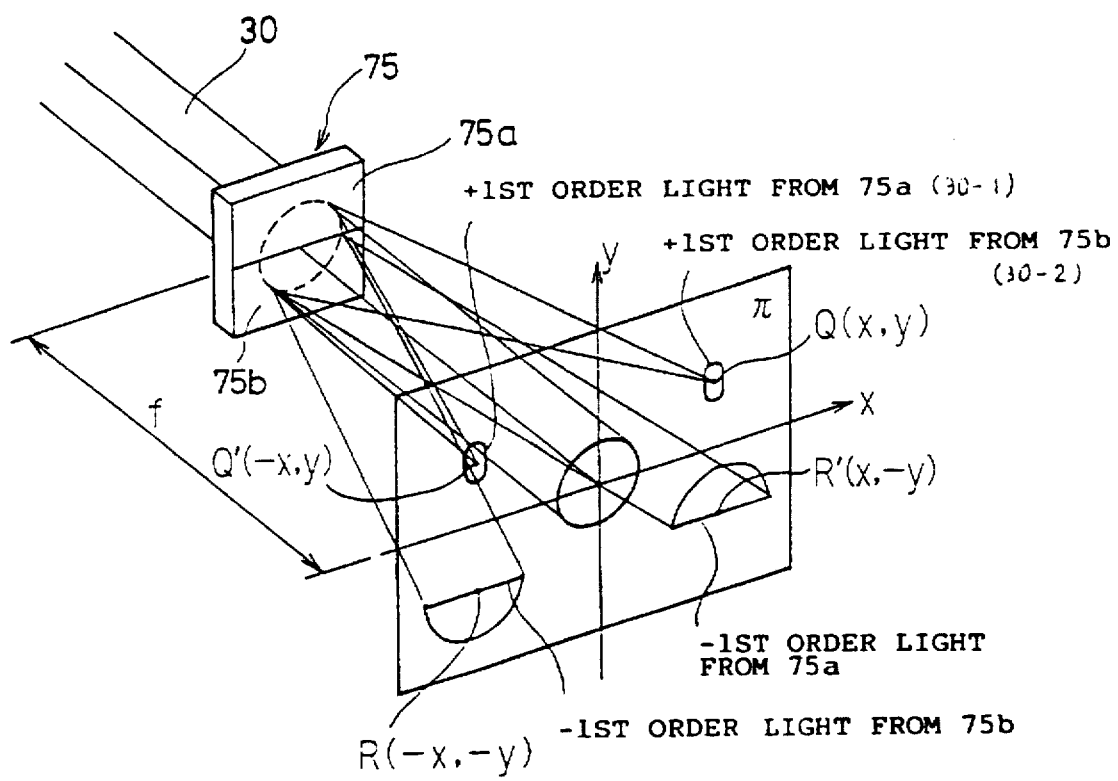
FIG. 32 is a perspective view for explaining desirable functions of the hologram optical element by itself.

According to the structure shown in FIG. 29, the +1st order diffracted light obtained from the first part 75a of the hologram optical element 75 may overlap the −1st order diffracted light obtained from the second part 75b, and the −1st order diffracted light obtained from the first part 75a may overlap the +1st order diffracted light obtained from the second part 75b. For this reason, the hologram optical element 75 may be constructed so that by itself the hologram optical element 75 acts on the light as shown in FIG. 32. In FIG. 32, those parts which are the same as those corresponding parts in FIG. 29 are designated by the same reference numerals, and a description thereof will be omitted.

In FIG. 32, the patterns of the first and second parts 75a and 75b are set so that the +1st order diffracted light 30-1 from the first part 75a converges to a point Q'(−x, y), the −1st order diffracted light from the first part 75a is projected in a semicircular shape about a point R'(x, −y), the +1st order diffracted light 30-2 from the second part 75b converges to a point Q(x, y), and the −1st order diffracted light is projected in a semicircular shape about a point R(−x, −y). The points Q, Q', R and R' are located on the plane π which is the distance f from the hologram optical element 75 along the optical axis.

Figure 33:
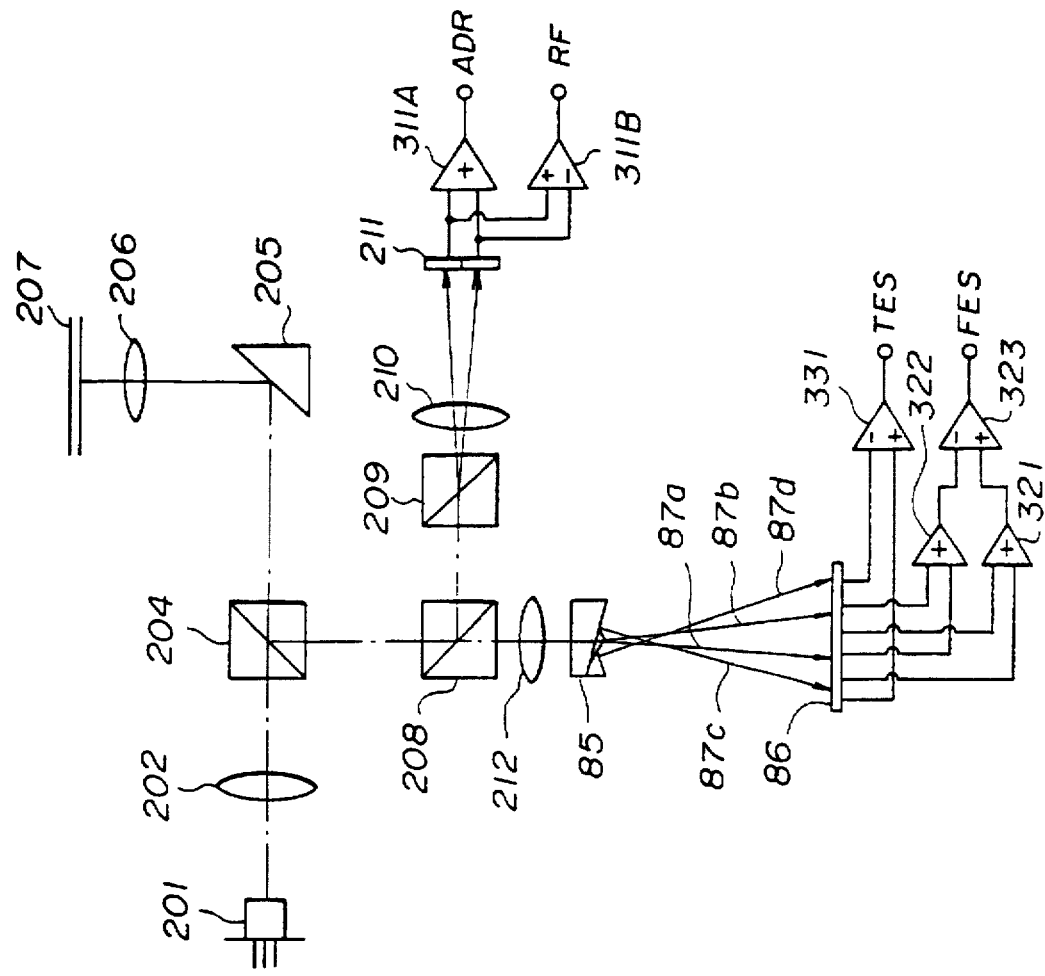
FIG. 33 is a diagram showing an eleventh embodiment of the optical information recording/reproducing apparatus according to the present invention.

Next, a description will be given of an eleventh embodiment of the optical information recording/reproducing apparatus according to the present invention, by referring to FIGS. 33 through 35. FIG. 33 shows the eleventh embodiment, FIG. 34 shows a composite prism of the eleventh embodiment, and FIG. 35 shows a perspective view of an essential part of the eleventh embodiment. In FIG. 33, those parts which are the same as those corresponding parts in FIG. 17 are designated by the same reference numerals, and a description thereof will be omitted.

In this embodiment, the spot of the light beam irradiated on the disk 207 via the objective lens 206 has a diameter of approximately 1 μm, for example. In addition, the outputs of the 2-part photodetector 211 are used to generate an address signal ADR via an adder 311A, and the outputs of the 2-part photodetector 211 are also used to reproduce the magneto-optic signal (information signal) RF via a differential amplifier 311B.

In this embodiment, a composite prism 85 splits the reflected light beam which is obtained via the condenser lens 212 into first through fourth light beams 87a through 87d. These first through fourth light beams 87a through 87d are irradiated on a photodetector 86. The photodetector 86 includes a first photodetector 86a which has 4 light receiving parts A through D for receiving the first and second light beams 87a and 87b, a second photodetector 86b which has a light receiving part E for receiving the third light beam 87c, and a third photodetector 86c which has a light receiving part F for receiving the fourth light beam 87d. As shown in FIG. 35, the first, second and third photodetectors 86a, 86b and 86c are arranged on the same plane. The first through third photodetectors 86a through 86c may or may not be separated from each other within the photodetector 86.

In FIG. 34, (a) shows a perspective view of the composite prism 85 on an enlarged scale, and (b) shows a plan view of the composite prism 85. As shown, the composite prism 85 includes a first emission surface 85a for emitting the first light beam 87a, a second emission surface 85b for emitting the second light beam 87b, and third and fourth emission surfaces 85c and 85d for respectively emitting the third and fourth light beams 87c and 87d. In FIG. 34 (a), the first emission surface 85a has a downward inclination to the right, the second emission surface 85b has a downward inclination to the left, and the third and fourth emission surfaces 85c and 85d form a mountain shape. In other words, the third emission surface 85c has a downward inclination to the right, the fourth emission surface 85d has a downward inclination to the left, and the third and fourth emission surfaces 85c and 85d connect to form the mountain shape.

The first emission surface 85a and the third emission surface 85c are inclined towards the same direction, and an inclination angle $\alpha_1$ of the first emission surface 85a relative to a reference plane is smaller than an inclination angle $\alpha_3$ of the third emission surface 85c. For example, the reference plane is the back surface of the composite prism 85, which is approximately perpendicular to the traveling direction of the incoming reflected light beam. On the other hand, the second emission surface 85b and the fourth emission surface 85d are inclined towards the same direction, and an inclination angle $\alpha_2$ of the second emission surface 85b is smaller than an inclination angle $\alpha_4$ of the fourth emission surface 85d.

In FIG. 35, the first light beam 87a which is emitted from the first emission surface 85a of the composite prism 85 is received by the light receiving parts A and D of the first photodetector 86a. In addition, the second light beam 87b which is emitted from the second emission surface 85b of the composite prism 85 is received by the light receiving parts B and C of the first photodetector 86a. Hence, a focal error signal FES is generated according to the Foucault technique based on the formula (2) described above. More particularly, the outputs of the light receiving parts A and C are added in an adder 321, the outputs of the light receiving parts B and D are added in an adder 322, and the outputs of these adders 321 and 322 are supplied to a differential amplifier 323 which outputs the focal error signal FES.

On the other hand, the third light beam 87c which is emitted from the third emission surface 85c of the composite prism 85 is received by the light receiving part E of the second photodetector 86b, and the fourth light beam 87d which is emitted from the fourth emission surface 85d of the composite prism 85 is received by the light receiving part F of the third photodetector 86c. Hence, a tracking error signal TES is generated according to the push-pull technique based on the formula (1) described above. More particularly, the outputs of the light receiving parts E and F are supplied to a differential amplifier 331, and the tracking error signal TES is output from this differential amplifier 331.

According to this embodiment, it is unnecessary to split the optical path into two by the beam splitter 213 shown in FIG. 1, even though the Foucault technique is used to generate the focal error signal FES and the push-pull technique is used to generate the tracking error signal TES. For this reason, it is possible to reduce the space occupied by the optical system within the optical information recording/reproducing apparatus. In addition, it is possible to reduce both the number of parts and the cost of the optical information recording/reproducing apparatus because this embodiment does not require the beam splitter 213 and the photodetector 214 shown in FIG. 1. Furthermore, compared to the case where the astigmatism technique is used to generate the focal error signal FES, it is possible to reduce the diameter of the beam spot formed on the photodetector and prevent effects of the external disturbance, thereby making it possible to improve the reliability of the optical information recording/reproducing apparatus.

Moreover, if the photodetector 86 is adjusted to detect a predetermined focal error signal FES, it is possible to employ a structure that would automatically receive the third light beam 87c by the light receiving part E of the photodetector 86b and receive the fourth light beam 87d by the light receiving part F of the photodetector 86c. Hence, there is an additional advantage in that no adjustment is required in this case for the detection of the tracking error signal TES.

Figure 36:
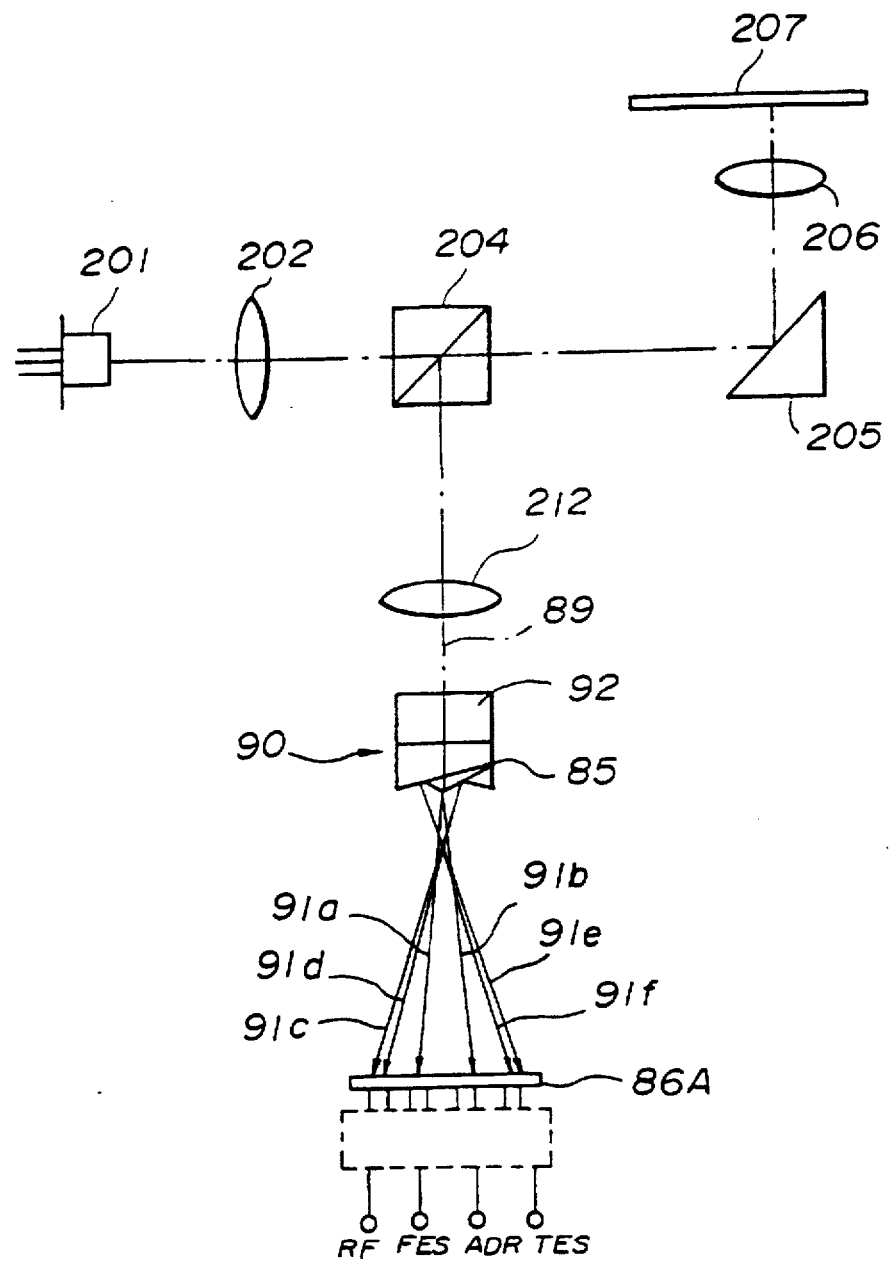
FIG. 36 is a diagram showing a twelfth embodiment of the optical information recording/reproducing apparatus according to the present invention.

Next, a description will be given of a twelfth embodiment of the optical information recording/reproducing apparatus according to the present invention, by referring to FIGS. 36 through 39. FIG. 36 shows the twelfth embodiment, and in FIG. 36, those parts which are the same as those corresponding parts in FIG. 33 are designated by the same reference numerals, and a description thereof will be omitted.

In this embodiment, an integral part 90 is provided in place of the composite prism 85 shown in FIG. 33. In addition, the beam splitter 208, the Wollaston prism 209, the condenser lens 210 and the photodetector 211 shown in FIG. 33 are not provided in FIG. 36.

The reflected light beam which is obtained via the beam splitter 204 is converted by the condenser lens 212 and is input to the integral part 90 which functions as a beam splitter means. Hence, the reflected light beam is split into first through sixth light beams 91a through 91f, and these first through sixth light beams 91a through 91f are irradiated on a photodetector 86A.

Figure 37:
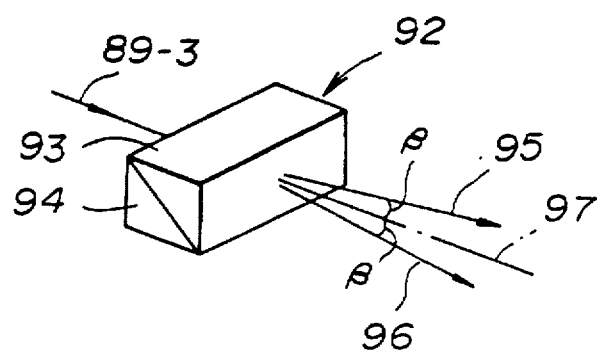
FIG. 37 is a perspective view showing a Wollaston prism of the twelfth embodiment.

The integral part 90 integrally comprises a Wollaston prism 92 shown in FIG. 37 and the composite prism 85 shown in FIG. 34. In other words, the Wollaston prism 92 is positioned immediately before the composite prism 85 along the traveling direction of a reflected light beam 89, and is adhered on the back of the composite prism 85 as shown in FIGS. 38 and 39.

The Wollaston prism 92 is made up of two triangular prisms 93 and 94 which are cut from a crystal and adhered together. The size of the Wollaston prism 92 corresponds to the central mountain shaped part of the composite prism 85. The Wollaston prism 92 is adhered on the back of the composite prism 85 immediately behind a mountain part 85e of the composite prism 85. In addition, the Wollaston prism 92 extends for the full width of the mounting part 85e. Hence, the Wollaston prism 92 splits the incoming reflected light beam in a direction in which a vertex 85f of the mountain part 85e extends.

Figure 39:
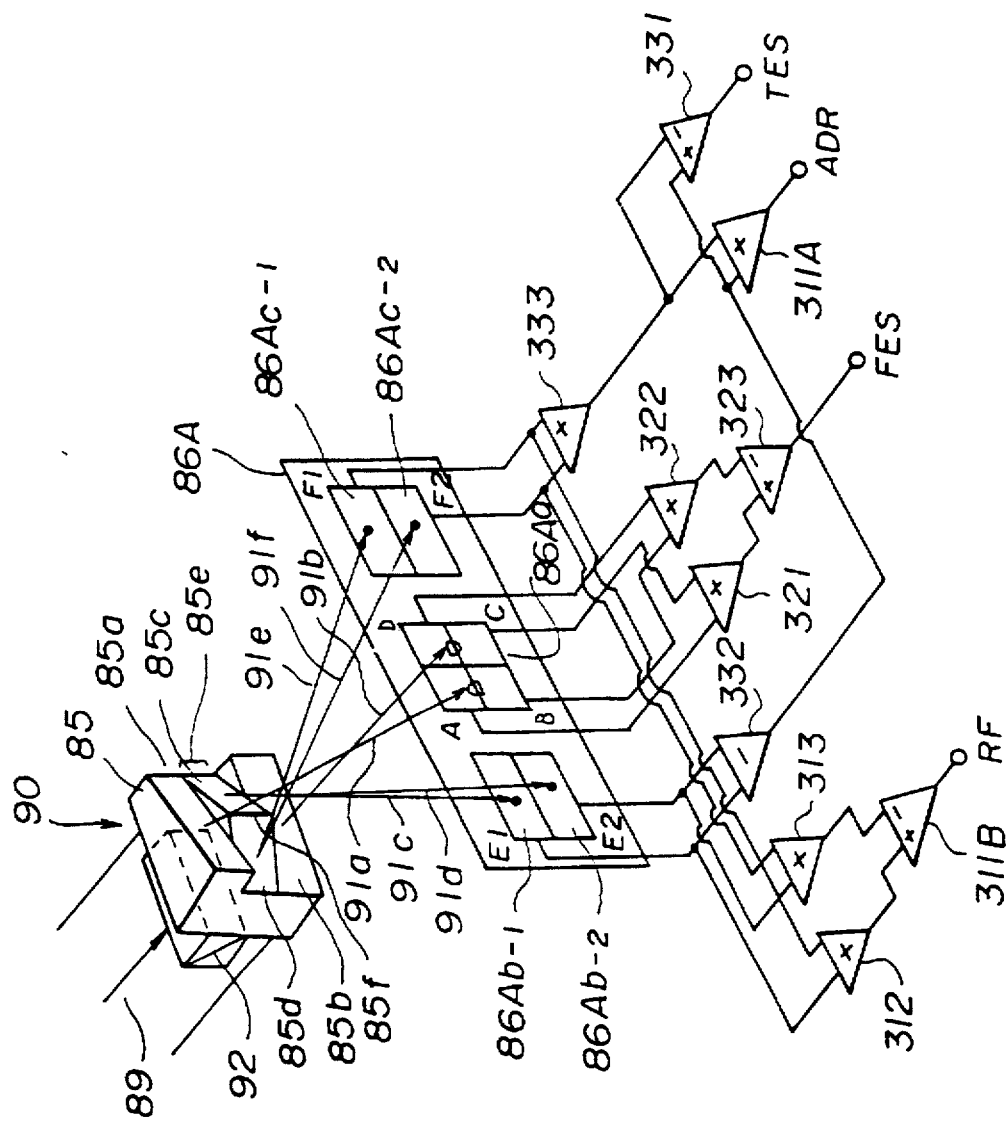
FIG. 39 is a perspective view showing an essential part of the twelfth embodiment.

On the other hand, the photodetector 86A includes a first photodetector 86Aa, a second photodetector 86Ab-1, a third photodetector 86Ab-2, a fourth photodetector 86Ac-1 and a fifth photodetector 86Ac-2 which are provided on a single plane as shown in FIG. 39. The first photodetector 86Aa includes four light receiving parts A through D for receiving the first and second light beams 91a and 91b. The second photodetector 86Ab-1 includes a light receiving part $E_1$ for receiving the third light beam 91c, and the third photodetector 86Ab-2 includes a light receiving part $E_2$ for receiving the fourth light beam 91d. The fourth photodetector 86Ac-1 includes a light receiving part $F_1$ for receiving the fifth light beam 91e, and the fifth photodetector 86Ac-2 includes a light receiving part $F_2$ for receiving the sixth light beam 91f.

Figure 38:
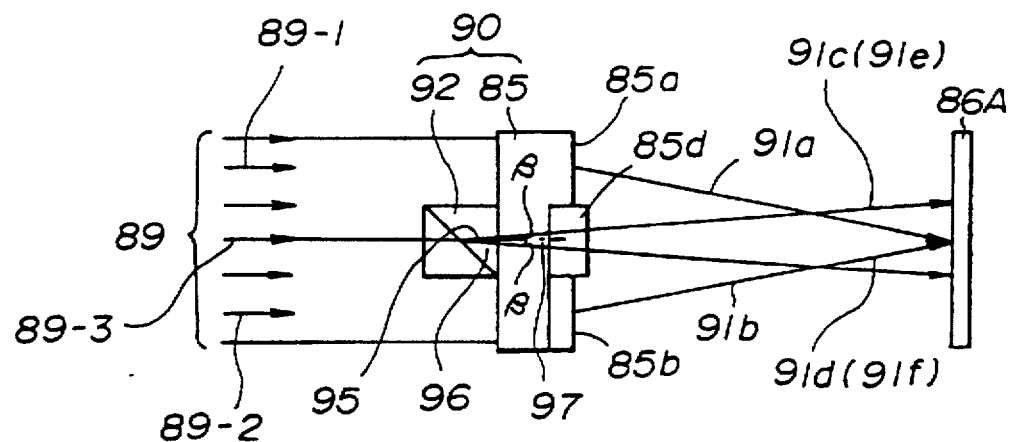
FIG. 38 is a diagram showing an integral part made up of a composite prism and the Wollaston prism of the twelfth embodiment.

Out of the reflected light beam 89 which is input to the integral part 90 via the condenser lens 212, a light component 89-1 which passes above the upper part of the Wollaston prism 92 in FIG. 38 and reaches the composite prism 85 directly is refracted by the first emission surface 85a and is emitted from the first emission surface 85a as the first light beam 91a. As shown in FIG. 39, this first light beam 91a is received by the light receiving parts A and D of the first photodetector 86Aa.

On the other hand, out of the reflected light beam 89 which is input to the integral part 90 via the condenser lens 212, a light component 89-2 which passes below the lower part of the Wollaston prism 92 in FIG. 38 and reaches the composite prism 85 directly is refracted by the second emission surface 85b and is emitted from the second emission surface 85b as the second light beam 91b. As shown in FIG. 39, this second light beam 91b is received by the light receiving parts B and C of the first photodetector 86Aa.

A focal error signal FES is generated according to the Foucault technique based on the formula (2) described above, similarly to the eleventh embodiment shown in FIG. 33.

Out of the reflected light beam 89 which is input to the integral part 90 via the condenser lens 212, a light component 89-3 which reaches the Wollaston prism 92 is split into a p-wave 95 and an s-wave 96. The p-wave 95 is deflected by an angle β with respect to an extension line 97 of the light component 89-3 towards the first emission surface 85a. On the other hand, the s-wave 96 is deflected by an angle β with respect to the extension line 97 towards the second emission surface 85b.

The p-wave 95 and the s-wave 96 output from the Wollaston prism 92 is input to the composite prism 85. The angle β is small, and the p-wave 95 and the s-wave 96 propagate within the mountain part 85e of the composite prism 85. The p-wave 95 and the s-wave 96 reach the third and fourth emission surfaces 85c and 85d and are refracted thereby, and are thereafter emitted from the third and fourth emission surfaces 85c and 85d.

In other words, in FIG. 39 the p-wave 95 is emitted from the third emission surface 85c as the third light beam 91c. This third light beam 91c irradiates the light receiving part $E_1$ of the second photodetector 86Ab-1. On the other hand, the s-wave 96 is emitted from the third emission surface 85c as the fourth light beam 91d. This fourth light beam 91d irradiates the light receiving part $E_2$ of the third photodetector 86Ab-2.

Similarly in FIG. 39, p-wave 95 is emitted from the fourth emission surface 85d as the fifth light beam 91e. This fifth light beam 91e irradiates the light receiving part $F_1$ of the fourth photodetector 86Ac-1. On the other hand, the s-wave 96 is emitted from the fourth emission surface 85e as the sixth light beam 91f. This sixth light beam 91f irradiates the light receiving part $F_2$ of the fifth photodetector 86Ac-2.

A tracking error signal TES is obtained based on the outputs of the light receiving parts $E_1$, $E_2$, $F_1$ and $F_2$ of the second through fifth photodetectors 86Ab-1 through 86Ac-2. More particularly, the tracking error signal TES is obtained through adders 332 and 333 and the differential amplifier 331 shown in FIG. 39, by calculating TES=$(E_1+E_2)-(F_1+F_2)$.

In addition a magneto-optic signal (information signal) RF is obtained based on the outputs of the light receiving parts $E_1$, $E_2$, $F_1$ and $F_2$ of the second through fifth photodetectors 86Ab-1 through 86Ac-2. More particularly, the magneto-optic signal RF is obtained through adders 312 and 313, and the differential amplifier 311B shown in FIG. 39, by calculating RF=$(E_1+F_1)-(E_2+F_2)$.

Furthermore, an address signal ADR is obtained based on the outputs of the light receiving parts $E_1$, $E_2$, $F_1$ and $F_2$ of the second through fifth photodetectors 86A*b*-1 through 86A*c*-2. More particularly, the address signal ADR is obtained through the adder 332, the adder 333, and the adder 311A shown in FIG. 39, by calculating ADR=(E$_1$+E$_2$)+(F$_1$+F$_2$).

According to this embodiment, it is possible to detect all of the focal error signal FES, the tracking error signal TES, the magneto-optic signal RF and the address signal ADR by use of a single optical path of the reflected light beam 89 and a single photodetector 86A.

By comparing FIG. 36 to FIG. 33, it may be seen that this twelfth embodiment shown in FIG. 36 does not have the optical path which extends horizontally from the beam splitter 208 in FIG. 33. For this reason, the space occupied by the optical system within the optical information recording/reproducing apparatus and the number of required parts are further reduced in this embodiment when compared to the eleventh embodiment. In other words, both the size and cost of the optical information recording/reproducing apparatus in this embodiment can further be reduced when compared to those of the eleventh embodiment.

In addition, if the photodetector 86A is adjusted to detect a predetermined focal error signal FES, it is possible to employ a structure that would automatically receive the third through sixth light beams 91*c* through 91*f* by the corresponding light receiving parts E$_1$, E$_2$, F$_1$ and F$_2$ of the second through fifth photodetectors 86A*b*-1 through 86A*c*-2. Hence, there is an additional advantage in that no adjustment is required in this case for the detection of the tracking error signal TES and the magneto-optic signal RF.

Of course, independent Wollaston prism and composite prism may be used in place of the integral part 90 which integrally comprises the Wollaston prism 92 and the composite prism 85. In other words, the independent Wollaston prism may be provided at a position to confront the back of the composite prism with a gap formed therebetween.

Further, the present invention is not limited to these embodiments, but various variations and modifications may be made without departing from the scope of the present invention.

What is claimed is:

1. An optical information recording/-reproducing apparatus which records information on and/or reproduces information from an optical recording medium and detects a focal error and a tracking error based on a reflected light beam from the optical recording medium, said optical information recording/reproducing apparatus comprising:

beam splitter means for splitting the reflected light beam into first through fourth light beams which propagate generally in a predetermined direction; and photodetector means for detecting the focal error in response to the first and second light beams, and for detecting the tracking error in response to the third and fourth light beams, wherein said beam splitter comprises a composite prism having a back surface which is substantially perpendicular to a traveling direction of the incoming reflected light beam and inclined first through fourth emission surfaces, said first and second emission surfaces being respectively inclined relative to the back surface in mutually opposite directions.

2. The optical information recording/reproducing apparatus as claimed in claim 1, wherein said photodetector means comprises a first photodetector including four light receiving parts for receiving the first and second light beams, and second photodetectors including light receiving parts for receiving the third and fourth light beams, said first and second photodetectors being provided on a single plane.

3. The optical information recording/-reproducing apparatus as claimed in claim 1, wherein said first and second emission surfaces are respectively inclined by angles $\alpha_1$ and $\alpha_2$ relative to the back surface in mutually opposite directions, said third and fourth emission surfaces being respectively inclined by angles $\alpha_3$ and $\alpha_4$ relative to the back surface in mutually opposite directions and forming a mountain shape between said first and second emission surfaces, said first and third emission surfaces being inclined in the same direction, said second and fourth emission surfaces being inclined in the same direction, wherein $\alpha_1 < \alpha_3$ and $\alpha_2 < \alpha_4$.

4. An optical information recording/-reproducing apparatus which records an information signal on and/or reproduces the information signal from an optical recording medium and detects a tracking error, a focal error, the information signal and an address signal based on a reflected light beam from the optical recording medium, said optical information recording/reproducing apparatus comprising:

beam splitter means for splitting the reflected light beam into first through sixth light beams which propagate generally in a predetermined direction; and photodetector means for detecting the focal error in response to the first and second light beams, and for detecting the tracking error, the information signal and the address signal in response to the third through sixth light beams, wherein said beam splitter comprises a composite prism having a back surface which is substantially perpendicular to a traveling direction of the incoming reflected light beam and inclined first through fourth emission surfaces.

5. The optical information recording/reproducing apparatus as claimed in claim 4, wherein said photodetector means comprises a first photodetector including four light receiving parts for receiving the first and second light beams, second through fifth photodetectors including light receiving parts for respectively receiving the third through sixth light beams, said first through fifth photodetectors being provided on a single plane.

6. An optical information recording/-reproducing apparatus which records an information signal on and/or reproduces the information signal from an optical recording medium and detects a tracking error, a focal error, the information signal and an address signal based on a reflected light beam from the optical recording medium, said optical information recording/reproducing apparatus comprising:

beam splitter means for splitting the reflected light beam into first through sixth light beams which propagate generally in a predetermined direction; and photodetector means for detecting the focal error in response to the first and second light beams, and for detecting the tracking error, the information signal and the address signal in response to the third through sixth light beams, wherein said beam splitter means comprises:

a composite prism having a back surface which is approximately perpendicular to a traveling direction of the incoming reflected light beam and inclined first through fourth emission surfaces, said first and second emission surfaces being respectively inclined by angles $\alpha_1$ and $\alpha_2$ relative to the back surface in mutually opposite directions, said third and fourth emission surfaces being respectively inclined by angles $\alpha_3$ and $\alpha_4$ relative to the back surface in mutually opposite directions and forming a mountain shape between said first and second emission surfaces, said first and third emission surfaces being inclined in the same direction, said second and fourth emission surfaces being inclined in the same direction, where $\alpha_1 < \alpha_3$ and $C_2 < \alpha_4$, and a Wollaston prism located immediately preceding said composite prism in the travelling direction of the incoming reflected light beam to confront the back surface at a position corresponding to the mountain shape so that said Wollaston prism splits the incoming reflected light beam in a direction in which a vertex of the mountain shape extends.

7. The optical information recording/reproducing apparatus as claimed in claim 6, wherein said composite prism and said Wollaston prism are integrally connected.

* * * * *